(12) United States Patent
Lin et al.

(10) Patent No.: US 12,602,755 B2
(45) Date of Patent: Apr. 14, 2026

(54) DEEP LEARNING-BASED HIGH RESOLUTION IMAGE INPAINTING

(71) Applicant: Adobe Inc., San Jose, CA (US)

(72) Inventors: Zhe Lin, Freemont, WA (US); Yuqian Zhou, Seattle, WA (US); Sohrab Amirghodsi, Seattle, WA (US); Qing Liu, Santa Clara, CA (US); Elya Shechtman, Seattle, WA (US); Connelly Barnes, Seattle, WA (US); Haitian Zheng, Rochester, NY (US)

(73) Assignee: Adobe Inc., San Jose, CA (US)

( * ) Notice: Subject to any disclaimer, the term of this patent is extended or adjusted under 35 U.S.C. 154(b) by 292 days.

(21) Appl. No.: 18/232,212

(22) Filed: Aug. 9, 2023

(65) Prior Publication Data

US 2025/0054115 A1 Feb. 13, 2025

(51) Int. Cl.
*G06T 5/77* (2024.01)
*G06T 3/4046* (2024.01)
*G06T 7/11* (2017.01)

(52) U.S. Cl.
CPC .............. *G06T 5/77* (2024.01); *G06T 3/4046* (2013.01); *G06T 7/11* (2017.01);
(Continued)

(58) Field of Classification Search
CPC . G06T 5/77; G06T 3/4046; G06T 7/11; G06T 2207/20021; G06T 2207/20056; G06T 2207/20081; G06T 2207/20084; G06T 2207/20132; G06T 2207/20016; G06T 3/4053; G06T 5/60
(Continued)

(56) References Cited

U.S. PATENT DOCUMENTS

2021/0150678 A1* 5/2021 Yi .......................... G06T 3/4046
2023/0342890 A1* 10/2023 Kanazawa .............. G06T 11/20
(Continued)

OTHER PUBLICATIONS

CM-GAN: Image Inpainting with Cascaded Modulation GAN and Object-Aware Training, by Zheng, Haitian et al., https://github.com/htzheng/CM-GAN-Inpainting, ARXIV ID: 2203.11947 Pub. Mar. 22, 2022(Year: 2022).*

(Continued)

*Primary Examiner* — Jennifer Mehmood
*Assistant Examiner* — Heath E. Wells
(74) *Attorney, Agent, or Firm* — Shook, Hardy & Bacon L.L.P.

(57) ABSTRACT

Various disclosed embodiments are directed to resizing, via down-sampling and up-sampling, a high-resolution input image in order to meet machine learning model low-resolution processing requirements, while also producing a high-resolution output image for image inpainting via a machine learning model. Some embodiments use a refinement model to refine the low-resolution inpainting result from the machine learning model such that there will be clear content with high resolution both inside and outside of the mask region in the output. Some embodiments employ new model architecture for the machine learning model that produces the inpainting result—an advanced Cascaded Modulated Generative Adversarial Network (CM-GAN) that includes Fast Fourier Convolution (FCC) layers at the skip connections between the encoder and decoder.

17 Claims, 14 Drawing Sheets

(52) U.S. Cl.
CPC ............... *G06T 2207/20021* (2013.01); *G06T 2207/20056* (2013.01); *G06T 2207/20081* (2013.01); *G06T 2207/20084* (2013.01); *G06T 2207/20132* (2013.01)

(58) Field of Classification Search
USPC ........................................................ 382/156
See application file for complete search history.

(56) References Cited

U.S. PATENT DOCUMENTS

| | | | | |
|---|---|---|---|---|
| 2023/0368341 | A1* | 11/2023 | Xu | ............................ G06T 5/77 |
| 2024/0104692 | A1* | 3/2024 | Pottorff | ................. G06T 3/4046 |
| 2024/0144431 | A1* | 5/2024 | Shi | .......................... H04N 23/90 |

OTHER PUBLICATIONS

SRInpaintor: When Super-Resolution Meets Transformer for Image Inpainting, by Feng Li • Anqi Li • Jia Qin • Huihui Bai • Weisi Lin • Runmin Cong • Yao Zhao, IEEE Transactions on Computational Imaging (vol. 8, 2022, pp. 743-758), Pub Jul. 11, 2022 (Year: 2022).*

Saharia, Chitwan, et al., "Palette: Image-to-Image Diffusion Models", SIGGRAPH '2022 Conference Proceedings, Vancouver, BC, Canada 2022, 10 pages.

Rombach, Robin, et al., "High-resolution Image Synthesis With Latent Diffusion Models", Ludwig Maximilian University of Munich & IWR, Heidelberg University Germany, 2021, 45 Pages, https://github.com/CompVis/latent-diffusion.

Ho, Jonathan, et al., "Cascaded Diffusion Models for High Fidelity Image Generation", Journal of Machine Learnearning Research, 23, 2022, 33 Pages, Submitted 6-21; Revised 12-21 ,Published 1-22.

Li, Haoying, et al., "Srdiff: Single Image Super-Resolution With Diffusion Probabilistic Models", Neurocomputing, vol. 479, Mar. 2022, pp. 47-59, https://www.sciencedirect.com/science/article/abs/pii/S0925231222000522.

Ledig, Christian, et al., "Photo-Realistic Single Image Super-Resolution Using a Generative Adversarial Network", Proceedings of the IEEE conference on computer vision and pattern recognition, 2017, 40 Pages.

Zheng, Chuanxia, et al., "Bridging Global Context Interactions for High-Fidelity Image Completion", Proceedings of the IEEE/CVF Conference on Computer Vision and Pattern Recognition, 2022, 22 Pages.

Yi, Zili, et al., "Contextual Rresidual Aggregation for Ultra High-Resolution Image Inpainting", Huawei Technologies Canada Co. Ltd., Proceedings of the IEEE/CVF Conference on Computer Vision and Pattern Recognition, 2020, pp. 7508-7517, https://github.com/Ascend-Huawei/Ascend-Canada/tree/master/Models/Research_HiFIII_Model.

Zhang, Lingzhi, et al., "Inpainting at Modern Camera Resolution by Guided PatchMatch with Auto-Curation", University of Pensylvania, SuperCaf, European Conference on Computer Vision, Springer, Cham, 2022, pp. 1-18.

Zhang, Kai, et al., "Designing a Practical Degradation Model for Deep Blind Image Super-Resolution", Proceedings of the IEEE/CVF International Conference on Computer Vision, 2021, pp. 1-10, https://github.com/cszn/BSRGAN.

Jain, Jitesh, et al., "Keys to Better Image Inpainting: Structure and Texture Go Hand in Hand", University of Oregon, WACV, Waikoloa, Hawaii, Jan. 3-7, 2023, 1 Page.

Zheng, Haitian, et al., "CM-GAN: Image Inpainting with Cascaded Modulation GAN and Object-Aware Training", University of of Rochester, Adobe Research, 2203. 2022, p. 1-31, https://github.com/htzheng/CM-GAN-Inpainting.

Kettunen, Markus, et al., "E-LPIPS: Robust Perceptual Image Similarity Via Random Transformation Ensembles", Aalto University, 2019, pp. 1-10, https://github.com/mkettune/elpips.

Chi, Lu et al., "Fast Fourier Convolution", Wangxuan Institute of Computer Technology, 2Center for Data Science Peking University, 34th Conference on Neural Information Processing Systems (NeruIPS 2020), Vancouver, Canada, 10 Pages.

* cited by examiner 700-2

700-1

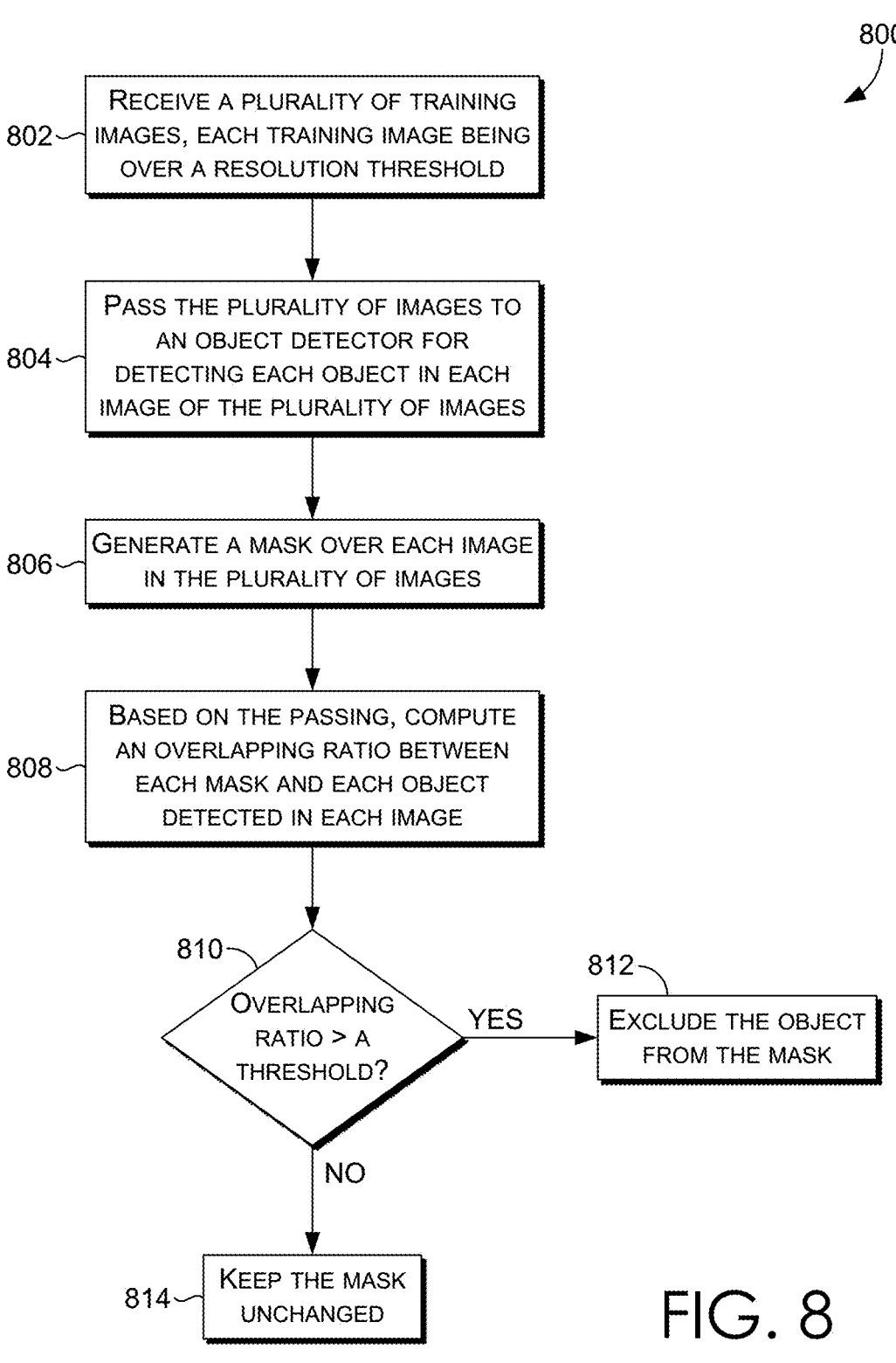

800

802 — RECEIVE A PLURALITY OF TRAINING IMAGES, EACH TRAINING IMAGE BEING OVER A RESOLUTION THRESHOLD

804 — PASS THE PLURALITY OF IMAGES TO AN OBJECT DETECTOR FOR DETECTING EACH OBJECT IN EACH IMAGE OF THE PLURALITY OF IMAGES

806 — GENERATE A MASK OVER EACH IMAGE IN THE PLURALITY OF IMAGES

808 — BASED ON THE PASSING, COMPUTE AN OVERLAPPING RATIO BETWEEN EACH MASK AND EACH OBJECT DETECTED IN EACH IMAGE

810 — OVERLAPPING RATIO > A THRESHOLD?

YES

812 — EXCLUDE THE OBJECT FROM THE MASK

NO

814 — KEEP THE MASK UNCHANGED

FIG. 8

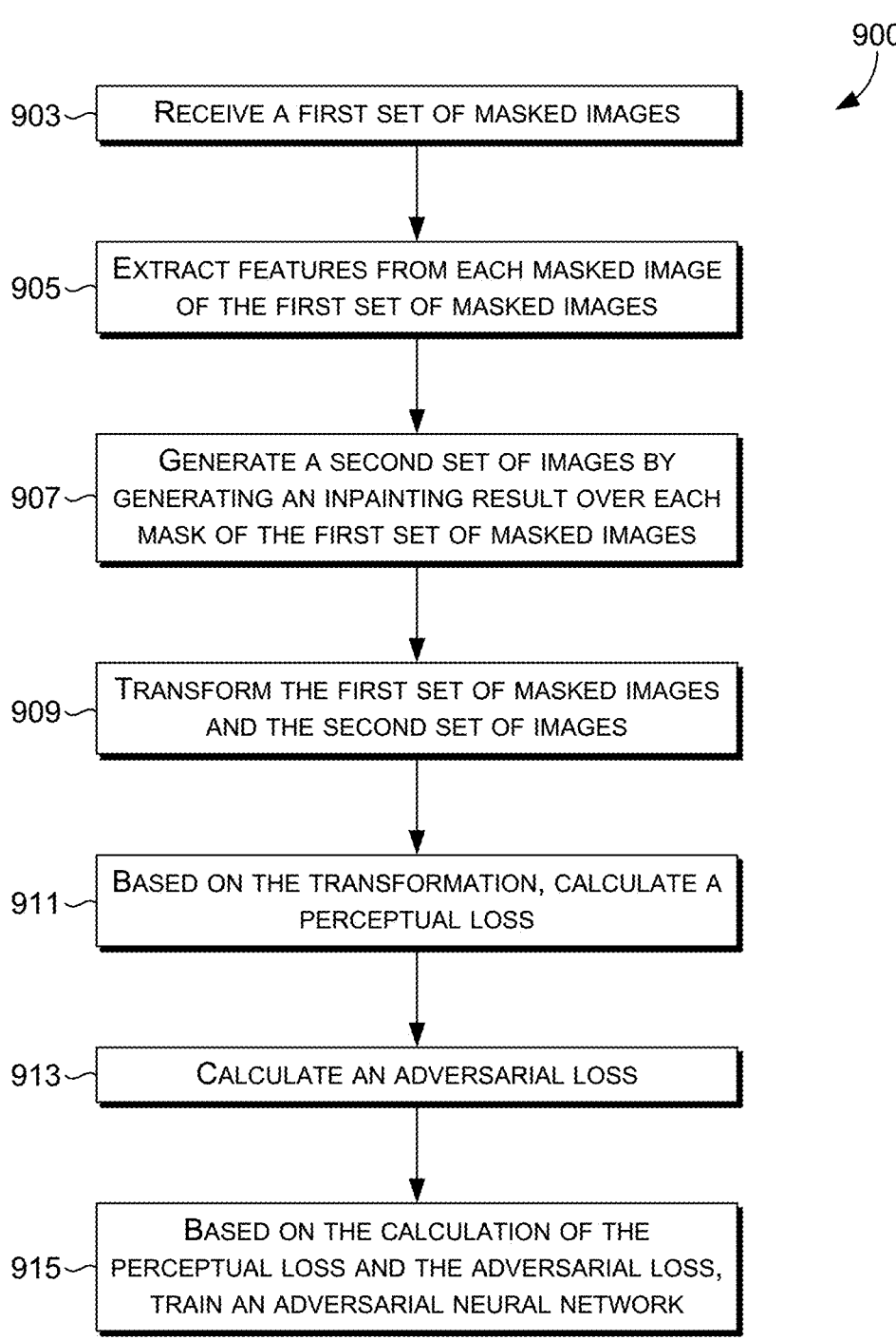

900

903 — RECEIVE A FIRST SET OF MASKED IMAGES

905 — EXTRACT FEATURES FROM EACH MASKED IMAGE OF THE FIRST SET OF MASKED IMAGES

907 — GENERATE A SECOND SET OF IMAGES BY GENERATING AN INPAINTING RESULT OVER EACH MASK OF THE FIRST SET OF MASKED IMAGES

909 — TRANSFORM THE FIRST SET OF MASKED IMAGES AND THE SECOND SET OF IMAGES

911 — BASED ON THE TRANSFORMATION, CALCULATE A PERCEPTUAL LOSS

913 — CALCULATE AN ADVERSARIAL LOSS

915 — BASED ON THE CALCULATION OF THE PERCEPTUAL LOSS AND THE ADVERSARIAL LOSS, TRAIN AN ADVERSARIAL NEURAL NETWORK

FIG. 9

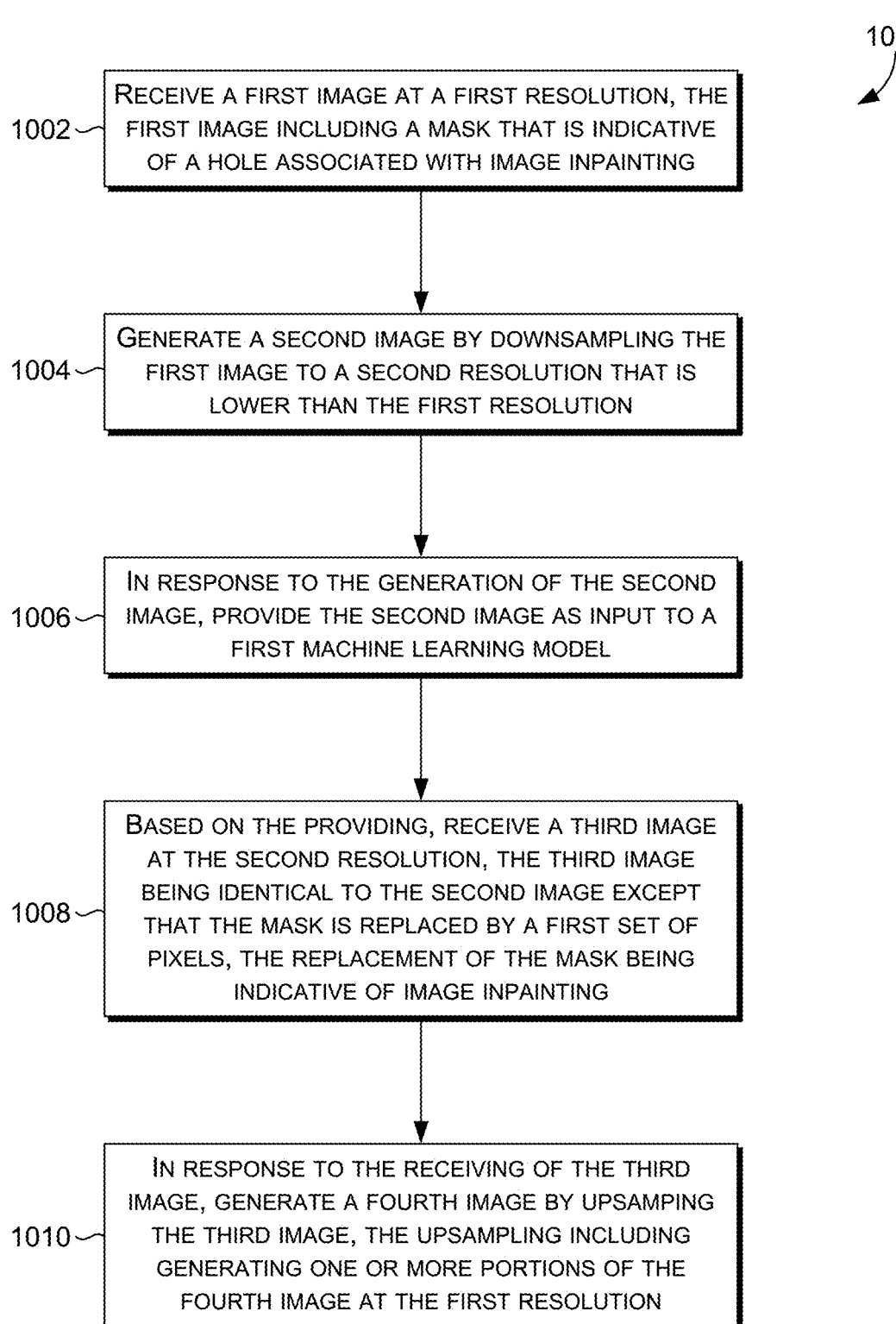

1000

1002 — RECEIVE A FIRST IMAGE AT A FIRST RESOLUTION, THE FIRST IMAGE INCLUDING A MASK THAT IS INDICATIVE OF A HOLE ASSOCIATED WITH IMAGE INPAINTING

1004 — GENERATE A SECOND IMAGE BY DOWNSAMPLING THE FIRST IMAGE TO A SECOND RESOLUTION THAT IS LOWER THAN THE FIRST RESOLUTION

1006 — IN RESPONSE TO THE GENERATION OF THE SECOND IMAGE, PROVIDE THE SECOND IMAGE AS INPUT TO A FIRST MACHINE LEARNING MODEL

1008 — BASED ON THE PROVIDING, RECEIVE A THIRD IMAGE AT THE SECOND RESOLUTION, THE THIRD IMAGE BEING IDENTICAL TO THE SECOND IMAGE EXCEPT THAT THE MASK IS REPLACED BY A FIRST SET OF PIXELS, THE REPLACEMENT OF THE MASK BEING INDICATIVE OF IMAGE INPAINTING

1010 — IN RESPONSE TO THE RECEIVING OF THE THIRD IMAGE, GENERATE A FOURTH IMAGE BY UPSAMPING THE THIRD IMAGE, THE UPSAMPLING INCLUDING GENERATING ONE OR MORE PORTIONS OF THE FOURTH IMAGE AT THE FIRST RESOLUTION

MEMORY

12

PROCESSOR(S)

14

PRESENTATION
COMPONENT(S)

16

I/O PORT(S)

18

I/O COMPONENTS

20

POWER SUPPLY

22

10

DEEP LEARNING-BASED HIGH RESOLUTION IMAGE INPAINTING

BACKGROUND

Some media editing technologies can reconstruct a portion of an image. For instance, some models perform image inpainting, which is a technique to complete or fill in missing regions (referred to as "holes" or "masks") of an image. Image inpainting is a fundamental task in computer vision and has many practical use-cases, such as object removal and manipulation, image retargeting, image compositing, and 3D photo effects. In an illustrative example, a user may select a set of pixels representing an unwanted real-world foreground object in a photograph. Inpainting technologies can remove or mask the set of pixels and replace them with other pixels matching the rest of the photograph such that the image appears as though the unwanted real-world object never existed. Despite these advances, machine learning systems and other inpainting technologies suffer from a number of disadvantages, particularly in terms of their high-resolution processing capabilities and their hole-filling quality, among other things.

SUMMARY

One or more embodiments described herein are directed to resizing, via down-sampling and up-sampling, a high-resolution (e.g., 4 k) input image in order to meet machine learning model low-resolution processing requirements, while also producing a high-resolution output image for image inpainting via a machine learning model. Some embodiments additionally use a refinement model to refine the low-resolution inpainting result from the machine learning model such that there will be clear content with high resolution both inside and outside of the mask region in the output. Some embodiments employ new model architecture for the machine learning model that produces the inpainting result—an advanced Cascaded Modulated Generative Adversarial Network (CM-GAN) that includes Fast Fourier Convolution (FCC) layers at the skip connections between the encoder and decoder.

One technical effect is the ability to process accurate high-resolution images during image inpainting. Most models cannot process high resolution images. They must instead perform compression techniques on high resolution images. Consequently, many pixels that correspond to finer details are lost, thereby reducing the output image quality in general, and also inpainting quality or accuracy. Various embodiments improve these technologies because they process high-resolution images and maintain the high resolution at the output. This is because these embodiments resize the input image via down-sampling and up-sampling. Down-samplig meets machine learning model processing requirements for image inpainting and upsampling provides a high-resolution output image.

Another technical effect is accurate "copy-paste" behavior for using pixels representing texture outside of an inpainting mask to fill in the mask, which causes, for example, the resulting image to appear seamless between the mask and the unmasked regions. This is because various embodiments implement the technical solution of Fast Fourier Convolution (FFC) layers at skip connections between an encoder and decoder of a modified GAN model. One technical solution is the use of a second machine learning model or refinement model (a second CM-GAN with fewer layers) that further refines and blends the masked region to be clear and at a same resolution as the unmasked regions.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 8 is a flow diagram of an example process for pre-processing training images in preparation for model training, according to some embodiments.

FIG. 9 is a flow diagram of an example process for training a Generative Adversarial Network (GAN), according to some embodiments.

FIG. 10 is a flow diagram of an example process for performing image inpainting via downsampling an input image and upsampling to an output image, according to some embodiments.

DETAILED DESCRIPTION

Overview

Figure 1:
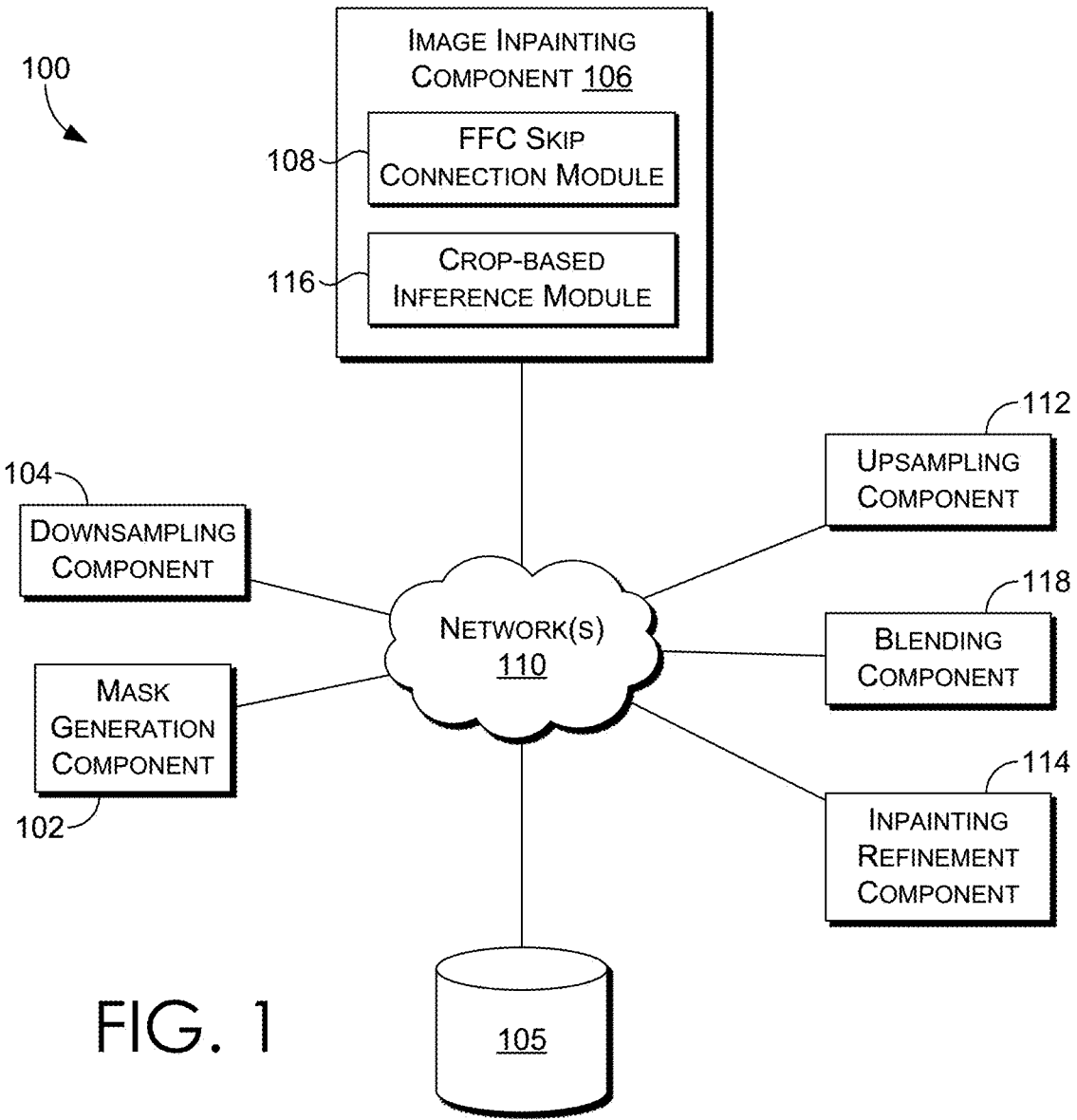
FIG. 1 is a block diagram of a computing system architecture in which aspects of the present disclosure are employed, according to some embodiments.

Although existing models can perform image inpainting, these models are trained and deployed to process images a lower resolutions, such as 256×256 or 512×512. Image resolution typically refers to the quantity of pixels in an image (or per unit (e.g., an inch), as in spatial resolution). This shortcoming is becoming more and more problematic as camera hardware and image capturing capabilities are rapidly evolving. For example, certain mobile devices employ advanced cameras and logic configured to capture only high-resolution images (e.g., 3000×4000). However, because existing models can only process low-resolution images, they cannot process high-resolution images at all, or the accuracy and processing quality is diminished considerably. This is because these models typically have to compress the image by reducing the quantity of pixels to fit the low-resolution requirements. Consequently, many pixels that correspond to finer details are lost, thereby reducing the output image quality in general, and also inpainting quality or accuracy.

Existing models are also deficient with respect to inpainting accuracy and quality regardless of the resolution requirements. These models struggle to generate plausible image structures when dealing with holes in images. This is partially due to the lack of effective network architecture structures that capture high-level semantics in the unmasked region and effectively propagate them into the masked region. Further, these models lack accurate "copy-paste" behavior for using pixels representing texture outside of the mask to fill in the mask, which causes, for example, the resulting image to appear heterogeneous or not as seamless between the mask and the unmasked regions.

The present disclosure provides one or more technical solutions that have technical effects in light of these technical problems, as well as other problems, as described herein. In operation, various embodiments are directed to resizing, via down-sampling and up-sampling, a high-resolution input image in order to meet machine learning model low-resolution processing requirements for image inpainting, but yet provide a high-resolution output image. Additionally, some embodiments use a refinement model to refine the low-resolution inpainting result from the machine learning model such that there will be clear content with high resolution both inside and outside of the masked region in the output. Additionally, some embodiments employ new architecture for the machine learning model that produces the inpainting result. For example, some embodiments employ an advanced Cascaded Modulated Generative Adversarial Network (CM-GAN) that includes Fast Fourier Convolution (FCC) layers at the skip connections between the encoder and decoder. Additionally, some embodiments use a crop-based strategy for image inpainting in order to deal with higher-resolution images, as described in more detail below.

In operation, some embodiments first receive a first image at a first resolution (e.g., a high-resolution 4K image), where the first image includes a mask that is indicative of a hole associated with image inpainting. For example, the first image may be a digital photograph with a mountain landscape background and the mask may contain multiple pixels with a single black color value, which contains the shape of and represents a car (which the user desires to remove). Some embodiments then generate a second image by downsampling the first image to a second resolution (e.g., 512×512). Downsampling is the reduction in spatial resolution while keeping the same two-dimensional (2D) representation. Upsampling is the increasing of the spatial resolution while keeping the 2D representation of an image. In an illustrative example of downsampling, the Pixels Per Inch (PPI) of the digital photograph described above can be reduced. In other words, downsampling contains the same two-dimensional representation of the mountain scene and mask (of a car) of the original image, but there are fewer pixels per inch. In upsampling, the resulting image contains the same two-dimensional representation of the mountain scene and the mask, but there are more pixels per inch.

In response to the generating of the second image, some embodiments provide the second image as input to a first machine learning model (e.g., an advanced CM-GAN). Based on the providing, some embodiments receive a third image at the second resolution, where the third image is included in an output of the first machine learning model. The third image is identical to the second image except that the mask is replaced by a first set of pixels (i.e., image inpainting). For example, using the illustration above, some embodiments feed the masked downsampled digital photograph to the machine learning model and the model may perform image inpainting by filling in the masked region with pixels based on the textures and patterns detected in the mountain scenery outside of the mask. In this way, the digital photograph appears as though the car never existed in the photograph. In response to the receiving of the third image, particular embodiments produce an output high-resolution image by upsampling the third image back to the first resolution (or higher than the second resolution). However, in some instances, the masked region (which is now covered by inpainting pixels) may still contain lower resolution than the rest of the image. Accordingly, some embodiments use a second machine learning model (e.g., a CM-GAN with fewer layers) in order to refine or change the resolution of the masked region to match the first resolution. Accordingly, in this way, the resolution of the entire inpainted output image matches the high-resolution of the input image.

Particular embodiments described herein improve existing image inpainting technologies because they process high-resolution images of high quality. This is partially because various embodiments implement a technical solution by resizing, via down-sampling and up-sampling, an input image. Downsamplig meets machine learning model processing requirements for image inpainting and upsampling provides a high-resolution output image. Particular embodiments are thus not merely compressing a quantity of pixels to fit the low-resolution requirements of models, leading to poor results. Rather embodiments, are upsampling the image back to a high-resolution format after downsampling. Consequently, many pixels that correspond to finer details are preserved in the output image, thereby improving the output image quality in general, and also inpainting quality or accuracy. Another technical solution with respect to high-resolution image inpainting is a crop-based inference strategy where an image is cropped into one or more smaller sections based on the size of the mask, as described in more detail below.

Particular embodiment have the technical effect of improved inpainting accuracy and quality regardless of the resolution requirements. One technical solution is machine learning model architecture structures that capture high-level semantics in the unmasked region and effectively propagate them into the masked region for image inpainting. For example, one technical solution is the use of a Generative Adversarial Network (GAN) that includes an encoder with Fourier Convolution blocks, and a decoder that includes a global modulation block and a spatial modulation block, as described in more detail below. One specific technical effect is an accurate "copy-paste" behavior for using pixels representing texture outside of the mask to fill in the mask, which causes, for example, the resulting image to appear seamless between the mask and the unmasked regions. This is because some embodiments implement the technical solution of Fast Fourier Convolution (FFC) layers at the skip connections between the encoder and decoder of the GAN model, as described herein. Another technical solution is the use of a second machine learning model or refinement model (a second CM-GAN with fewer layers) that further refines and blends the masked region to be clear and at a same resolution as the unmasked regions.

Exemplary System

Referring now to FIG. 1, a block diagram is provided showing aspects of an example computing system architecture suitable for implementing an embodiment of the disclosure and designated generally as the system 100. The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 1200 of FIG. 12). Alternatively, some or each of the components may be distributed among various computing devices, such as in a distributed cloud computing environment. In some embodiments, the system 100 and each of the components are located within the server and/or user device of FIG. 11, as described in more detail herein.

The system 100 includes network 110, which is described in connection to FIG. 11, and which communicatively couples components of system 100, including the mask generation component 102, the downsampling component 104, the image inpainting component 106, the upsampling component 112, the blending component 118, and storage 105. The components of the system 100 may be embodied as a set of compiled computer instructions or functions, program modules, computer software services, logic gates, hardware circuitry (e.g., an AI accelerator, such as at a GPU), or an arrangement of processes carried out on one or more computer systems.

The system 100 generally operates to reconstruct one or more portions of one or more images (e.g., image inpainting). In some embodiments, thy system 100 generates content inside masked regions (e.g., holes) of an image. An "image" as described herein is a visual representation of one or more portions of the real world or a visual representation of one or more documents. For example, an image can be a digital photograph, a digital image among a sequence of video segments, a graphic image file (e.g., JPEG, PNG, etc.), a picture (or sub-element of a picture), and/or a bitmap among other things. A "mask," or "masking" as described herein refers to hiding one or more layers or pixels in the target image. In some embodiments, a mask is a matrix of values, where one value represents a particular object associated with a logical hole. For example, several pixels contain a value of 1 representing the logical hole or object requested to be removed, and the rest of the image includes a 0 value representing a non-masked region of the image. For example, a mask can include or represent an undesirable street sign object in an image, where the undesirable street sign object is represented by a single black pixel value.

The mask generation component 102 is generally responsible for generating a mask or hole at an image. In some embodiments, the generating of the mask occurs automatically (without a user request), which highlights or indicates one or more objects in an image. For example, before the mask is created, an object detector can detect one or more objects in an input image. An "object" as described herein refers to visual data that represents a real-world or recognizable thing, such as an animal, car, building, a tree, or the like.

In some embodiments, before creating a mask, the mask generation component 102 first performs object detection functionality to detect one or more objects in an image. In an illustrative example of object detection functionality, particular embodiments use one or more machine learning models (e.g., a Convolutional Neural Network (CNN)) to generate a bounding box that defines the boundaries and encompasses a computer object representing a feature (e.g., a car, the sky, a building, a person, etc. . . . ) in an image. In computer vision applications, the output of object detection can be encompassed by a bounding box. A bounding box encompasses the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects in documents. In an illustrative example, on an image, a first bounding box can be generated over a cat in an image and labeled as "cat", a second bounding box can be generated over a dog and labeled "dog", and a third bounding box can be generated over a mountain objects and labeled as "mountain".

In some embodiments, one or more machine learning models can be used and trained to generate tighter bounding boxes for each object. In this way, bounding boxes can change in shape and confidence levels for classification/ prediction and can be increased based on increased training sessions. For example, the output of a CNN or any other machine learning model described herein can be one or more bounding boxes over each feature of an image (corresponding to a feature in an image), where each bounding box includes the classification prediction (e.g., this object is a building) and the confidence level (e.g., 90% probability).

In some embodiments, in response to detecting a set of objects, via a bounding box, the mask generation component 102 programmatically calls an object boundary extractor in order to more precisely determine pixel-wise boundaries of all the set of objects contained in bounding boxes and then the mask generation component 102 responsively masks the corresponding region. In some embodiments, the mask generation component 102 performs its functionality via semantic segmentation. Semantic segmentation refers to the task of assigning and indicating (e.g., via a unique pixel-wise mask color or ID) each pixel to a particular class of a real-world object or background represented in an image. For example, semantic segmentation functionality may define a first set of pixels as representing a "bird" and a second set of pixels as also representing a "bird," where both birds are represented by the same mask pixel value. In some embodiments, instance segmentation is additionally performed. Instance segmentation assigns and defines, with a unique identifier, each pixel to the instance of the real-world object it belongs to. For example, using the illustration above, the first set of pixels representing the first bird may be assigned an instance ID of 1 and a first color mask pixel value. Likewise, the second set of pixels representing the second detected bird may be assigned an instance ID of 2 and/or different mask color pixel value.

The combination of semantic segmentation and instance segmentation is what is referred to as panoptic segmentation. Specifically, in panoptic segmentation, all pixels of an image are uniquely assigned to one of the background classes (referred to as "stuff") or one of the object instances (referred to as "things"). For things, panoptic segmentation functionality thus classifies each pixel in an image as belonging to a particular class and identifies what instance of the class the pixel belongs to. For stuff, panoptic segmentation performs identical functionality as semantic segmentation.

Semantic segmentation is typically a deep learning algorithm that associates a label or category with every pixel in an image. The idea is to label each pixel of an image with a corresponding class of what is being represented. It is used to recognize a collection of pixels that form distinct categories. For example, a model can be trained to mask objects with pixel values of vehicles, pedestrians, traffic signs, pavement, or other road features. For example, a CNN can perform image-related functions at each layer and then down sample the image using a pooling layer. This process is repeated several times for the first half of the network. The output from the first half of this diagram is followed by an equal amount of unpooling layers. In some embodiments, the mask generation component 102 performs its functionality via MASK AI. Mask AI detects at least nine separate elements in a photo: people, skies, buildings, vehicles, water, plants, mountains, and both natural and artificial ground for the perfect mask. The output of the mask generation component 102 is an in image with one or more masks.

In some embodiments, the mask generation component 102 generates a mask based on a user request alternative to or in addition to automated masks as described above. For example, some embodiments receive an indication that a user has provided a lasso gesture over an arbitrary portion in a background of an image, which is indicative that the user would like to remove that portion and replace it with another portion. Responsive to the lasso gesture, particular embodiments mask the region inside the lasso gesture.

The downsampling component 104 is generally responsible for downsampling an image that has been masked via the mask generation component 102. Downsampling techniques typically averages pixels within a sample area. The average pixel value is then assigned to the entire pixel area. For example, in some embodiments, the downsampling component 104 represents a heuristic downsampling method (e.g., bi-cubic) to downsize (from 4 k) the image into 512 X×512 px. Heuristic methods do not use machine learning models. Heuristic methods are irrelevant to downstream tasks since they typically consider the low-level information and perform according to certain pre-determined rules. Taking the widely used farthest point sampling (FPS) as an example, sampled points are selected in an iterative way: starting from a random initial point, the FPS samples the most distant point from the sampled set with regard to the rest points. Bicubic downsampling uses a weighted average within a given area to determine pixel value. With this type of downsampling, all pixels are compared and averaged to the center pixel. The new pixel is an average of these neighboring pixels.

In some embodiments, the downsampling component 104 represents or uses a machine learning model (a learning-based method) to downsample the image. Learning-based methods utilize neural networks to build a learnable sampler that is optimized with downstream task constraints. Existing approaches typically use an indirect way to realize arbitrary-size downsampling. For example, some embodiments first generate a point set of the same size as the input. Then, with a progressive optimization scheme, the generated points are reordered according to their importance to downstream tasks. Finally, to obtain the sampled set of a given size, they select points according to their order in the generated set.

The image inpainting component 106 is generally responsible for performing image inpainting to fill in the mask region of the image produced by the downsampling component 104. Thus, the output of the image inpainting component 106 is an image produced by the downsampling component 104, except the mask is filled in. The image inpainitng component 105 represents or uses any suitable inpainting techniques or models, such as patch-based methods (i.e., copying and pasting patches from known regions to progressively fill in the mask), diffusion-based methods (i.e., solve the color propogation inside the mask via partial differential equations), or deep generative models, which directly predict what content will fill in the mask via adversarial training. For example, in some embodiments, the image inpainting component represents a Generative Adversarial Network (GAN) that includes an encoder with Fourier convolution blocks and a decoder that includes a global modulation block and a spatial modulation block, and skip connections between the encoder and decoder (i.e., a CM-GAN), as described in more detail below. The FFC skip connection module 108 is generally responsible for generating or using Fast Fourier Convolution (FFC) layers at skip connections between and encoder and decoder of a machine learning model, as described in more detail below.

The crop-based inference module 116 is generally responsible for performing image inpainting based on the size of the mask and using non-masked portions immediately next to the mask for images over a resolution threshold. Image resolution is typically expressed as a horizontal/width (i.e., row) pixels by vertical/height (i.e., column) quantity of pixels. For example, an image resolution of 6000×600 indicates that an image measures 6000 pixels in width and 4000 pixels in height. For example, the resolution threshold can be any size beyond 2048 pxl. In many use cases, the size of the hole/mask region is relatively small compared with the entire image. Useful context information/pixels is around the hole region, and image content far away from the hole is less relevant, and thus less important for the inpainting task. Based on the height and width of the hole region, the crop-based inference module 116 calculates a minimum crop size that can be used to crop the image in the non-masked region(s) so the input to the inpainting framework will be smaller and with enough relevant context information. In some embodiments, hole-to-non-hole ratio less than 30% in the input crop results in best inpainting quality and solves most inpainting tasks for high-resolution images beyond 2048.

The upsampling component 112 is generally responsible upsampling the inpainted image produced by the image inpainting component 106. For example, as described above, in some embodiments, the upsampling component 104 represents a heuristic upsampling method (e.g., bi-cubic) to resize the image from 512 X×512 back to 4 k pixels. As described above, in some embodiments, downsampling and upsampling uses heuristic-based methods without machine learning, whereas in other embodiments, downsampling and upsampling includes the use of machine learning models.

The blending component 118 is generally responsible for blending the resulting image of the upsampling component

112 with the input image produced by the mask generation component 102. In some embodiments, such blending includes smoothing the boundaries of the inpainting mask (i.e., the portion of pixels filled in over the mask) and the non-masked portion(s) of the image. In some embodiments, the blending component 118 blends the inpainting mask with the original content of the crop outside the hole and pastes the crop back to the whole image, so the size of the final output matches the original image. In some embodiments, blending includes transferring content from image 202 to the image 214 and interpolating the error in the transition (or boundary) region between masked and non-masked regions to address color, resolution, sharpness, and/or other inconsistencies. For example, the content of the non-masked region 202-2 is mixed, within each resolution band independently, with its new surrounding in the image 214. Subsequently, particular embodiments add up the different levels of the new composite Laplacian pyramid thus obtained. The technique results in multiresolution mixing where finest details are averaged very locally around the boundary of the selection (e.g., the mask), while lower frequencies are mixed over much larger distances around these boundaries. This fast technique achieves an approximate insertion of the source Laplacian in the destination region (on the first level of the Laplacian pyramid) whereas embodiments perform this Laplacian insertion exactly via the solution of a Poisson equation. Multiresolution blending incorporates data from distant source and destination pixels, via the upper levels of the pyramid, within the final composite image.

The inpainting refinement component 114 is generally responsible for refining the filled in region (over the mask) after upsampling via the upsampling component 112 and/or blending via the blending component 118. "Refining" in some embodiments, includes continued upsampling, sharpening, and/or adding clarity to this inpainting mask region. In many instances, even after the image inpainting component 106 fills in the mask with pixels and the upsampling component 112 upsamples the entire image, the pixels in the region over the mask are still lower in resolution or not as sharp relative to the non-masked region. Therefore, the inpainting refinement component 114 can adjust the pixels, either by adding pixels or resolution, changing sharpness, or otherwise clarifying the filled in region. For example, in some embodiments, the inpainting refinement component 114 modifies the resolution to match what the resolution is outside of the masked region.

In some embodiments, the inpainting refinement component 114 represents or uses any suitable inpainting techniques or models, as described herein, such as patch-based methods, diffusion-based methods, or deep generative models. For example, in some embodiments, the inpainting refinement component 114 represents a second CM-GAN with fewer layers, as described in more detail below.

The storage 105 represents and suitable data store, such as a database, storage device (e.g., RAM or disk drive), and/or a storage system (e.g., a Storage Area Network (SAN) or RAID). The storage 105 can include different images (e.g., labeled images) that have been used to train deep networks or other machine learning models, as described herein.

Figure 2:
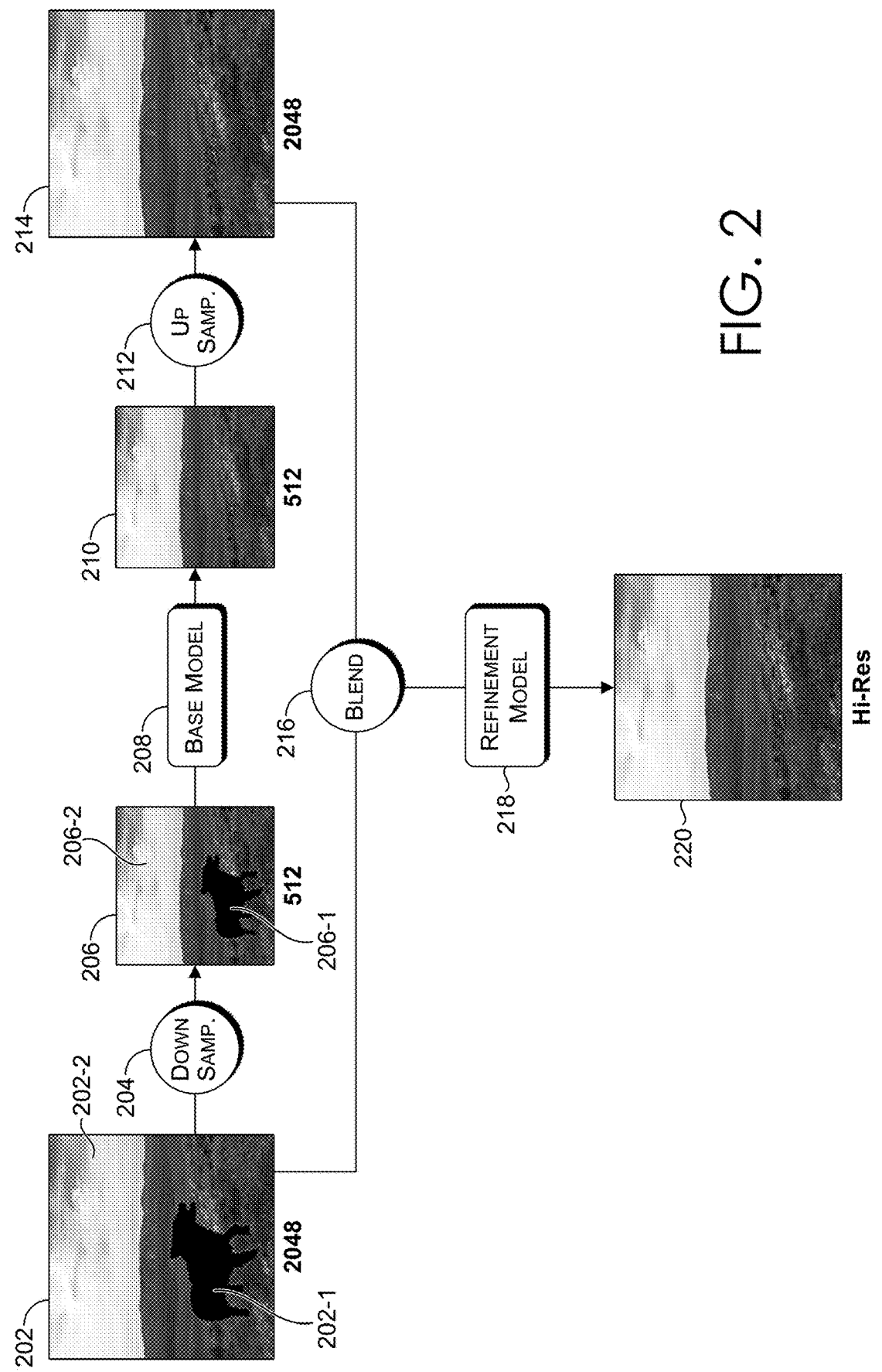
FIG. 2 is a schematic diagram visually illustrating the inputs and outputs with respect to images and two models for high-resolution inpainting, according to some embodiments.

Turning now to FIG. 2, a schematic diagram visually illustrating the inputs and outputs with respect to images and two models for high-resolution inpainting, according to some embodiments. At a first time, a high-resolution 2048× 2048 image 202 is received. The image 202 includes the mask 202-1 (i.e., a "hole") and the non-masked region 202-2. As illustrated in the image 202, the mask 202-1 includes multiple masked pixels with 1 value (e.g., a black color), which represents a foreground silhouette of a fox animal real-world object. The non-masked region 202-2 is another set of pixels at different values that represent the background scenery behind the fox animal real-world object. In some embodiments, the image 202 represents the output image of the mask generation component 102 as described with respect to FIG. 1. Accordingly, for example, the mask 202-1 may, at a first time, represent an object detected via panoptic segmentation and/or object detection before becoming the mask 202-1. Such object may initially contain various pixel values representing a brown and gray color of the wolf, as well as various features, such as eyes, mouth, and paws. However, in response to a masking request to mask the wolf, particular embodiments change the brown and gray color as well as values representing the other features (the eyes, mouth, and paws) to a black color (or other mask value), as illustrated by the mask 202-1.

The image 202 is then downsampled 204 or downsized to 512×512 resolution image 206. In some embodiments, the downsample operation 204 is performed by the downsampling component 104, as described with respect to 104. The image 206 includes the mask 206-1 and the non-masked region 206-2. As illustrated in FIG. 2, the image 206 (and corresponding mask 206-1 and non-masked region 206-2) is identical or similar to the input image 202, except that the image 206 has been downsampled to a lower resolution (i.e., 512×512) relative to the input image 202 (which is 2048× 2048 resolution).

After the downsampled image 206 has been produced, it is provided to the base model 208 (e.g., an improved CM-GAN), which performs image inpainting by predicting and filling in the mask 206-1 to generate the image 210, which is at 512×512 resolution. As illustrated in FIG. 2, the base model 208 predicts what the image 206 would appear like if the real-world wolf object (corresponding to the mask 206-1) was not present in the image 206. For example, in some embodiments, the base model 208 learns texture and pixel value pattern information in the non-masked region 206-2 (e.g., pixels representing the ground) and propagates such information into the mask 206-1 to derive the image 210, which is described in more detail below. Image inpainting includes cropping a certain region (e.g., a portion of the non-masked region 206-2 of a source image) and placing it onto the image 210 at or over a location corresponding to the location of the mask 206-1. In some embodiments, the base model 208 includes the image inpainting component 106 as described with respect to FIG. 1. In some embodiments, the base model 208 performs image inpainting via the FFC skip connection module 108 and/or the crop-based inference component 116, as described with respect to FIG. 1.

At operation 212, particular embodiments upsample 212 the image 210 from 512×512 resolution back to a high-resolution image 2048×2048, denoted by the image 214. In some embodiments, the upsampling 212 occurs via the upsampling component 112 of FIG. 1. For example, some embodiments use a heuristic up-sampling bi-cubic method to resize the image 210 back to 2048×2048 (i.e., the image 214). Responsive to generating such image 214, some embodiment blend 216 the image 214 with the original input image 202, as illustrated in FIG. 2. In some embodiments, blending 216 includes the operations described with respect to the blending component 118 of FIG. 1. In some instances, after blending 216, there is a resulting image of 2048×2048 pxl with low-resolution (blurry) inpainting result inside the hole (i.e., the inpainting mask), and original high-resolution image content outside the hole. Particular embodiments then input this resulting image into a refinement model 218 (e.g., a CM-GAN refinement model) to refine the low-resolution inpainting result so the final output image 220 will have clear and sharp content inside the hole with high-resolution. In some embodiments, the refinement model 218 includes the functionality as described with respect to the inpainting refinement component 114 of FIG. 1.

Figure 3:
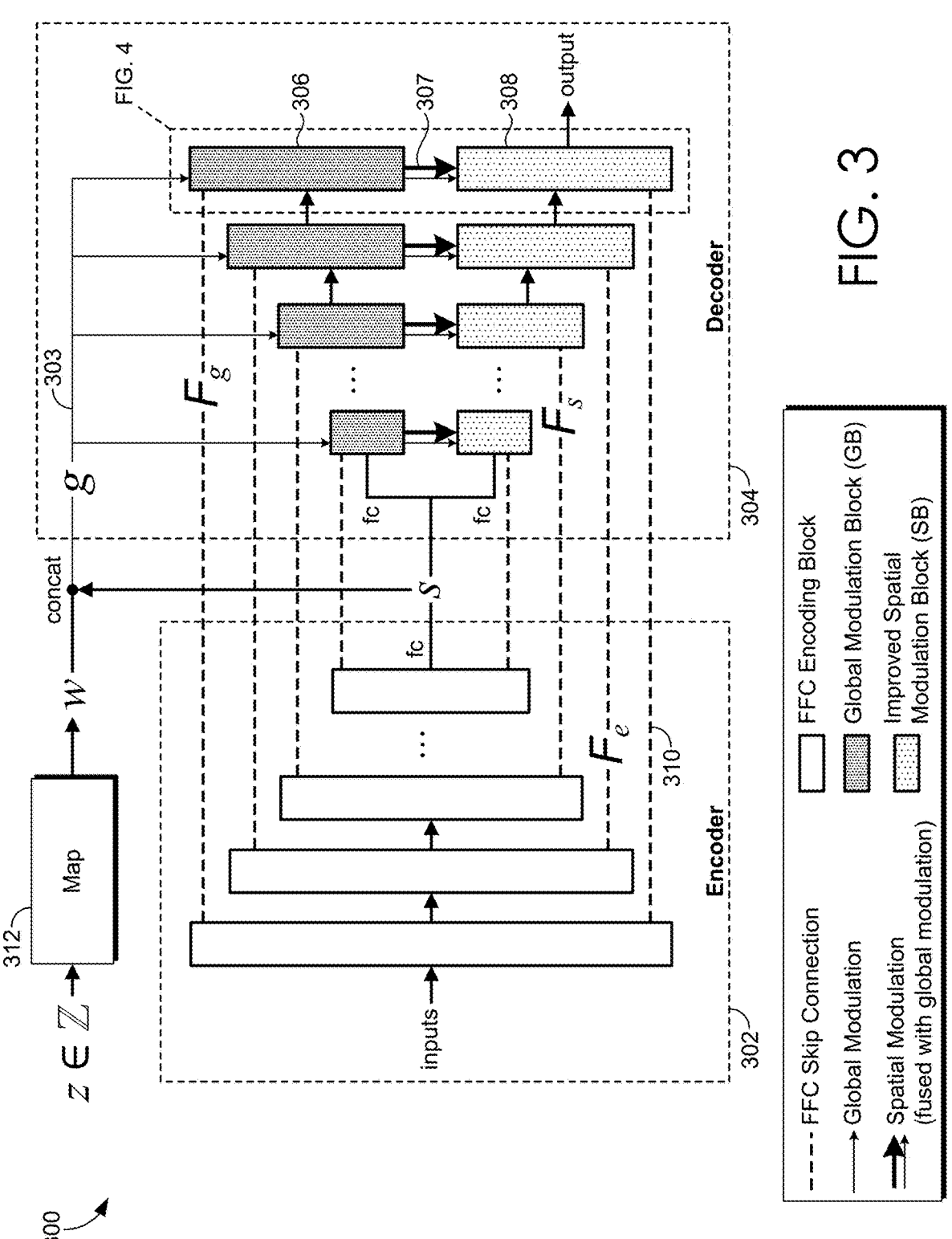
FIG. 3 is a schematic diagram of an example improved Cascaded Modulation (CM) Generative Adversarial Network (GAN), according to some embodiments.

FIG. 3 is a schematic diagram of an example improved Cascaded Modulation (CM) Generative Adversarial Network (GAN) 300, according to some embodiments. In some embodiments, the CM-GAN 300 is used by or represents the image inpainting component 106 of FIG. 1 and/or the base model 208 of FIG. 2. The CM-GAN 300 includes an encoder 302 with FFC blocks and a two-stream decoder 304, which includes a Global Modulation Block (GB) 306 and a subsequent spatial Modulation Block (SB) 308. This cascaded modulation scheme extracts spatial style codes from the globally modulated feature map 312 (instead of from the encoder feature map) to make spatial modulation more effective for inpainting.

At a first time, the encoder 302 takes one or more sections of an input image and the mask as inputs to produce multi-scale feature maps $$F_e^{(1)}, \dots, F_e^{(L)}$$

at each scale $1 \le i \le L$ (L is the highest level with the smallest spatial size). A "scale" refers to a particular size, as represented by the vertical bars in FIG. 3. Particular embodiments extract a global style code s from the highest level feature $$F_e^{(L)}$$

with a fully connected layer followed by a $l_2$ normalization. A "global style code" as described herein refers to an indication (e.g., a vector, tensor, or hash, etc.) that captures the context (e.g., pixel orientations and colors) of an entire image. Furthermore, a model (e.g., a MLP-based mapping network) is used to generate a style code w from noise, simulating the stochasticity of image generation. The code w is joined with s to produce a global code g=[s; w] for the consequent decoding steps.

In some embodiments, a "style code" as described herein refers to the manner in which the content of images are generated or styled, as opposed to the content itself. For example, a style code may refer to the shading, texture, lighting or any other effect on all objects in an image. In various instances, any objects detected or detectable (e.g., via an object recognition component) in an image correspond to the content or payload of an image, whereas the pattern of all actual pixel values in the target image (or selected portion(s) of the target image) correspond to the style codes. It is understood that sometimes image content and style codes are not completely disentangled. Accordingly, in some embodiments where neural networks are used, "style codes" additionally or alternatively refers to the feature correlations of lower layers of a neural network. The higher layers in a neural network capture the high-level content in terms of objects and their arrangement in the target image but do not strictly constrain the exact pixel values of the reconstruction. In contrast, reconstructions from the lower layers reproduce the exact pixel values of the target image—i.e., the style codes.

The decoding stage 304 is based on two branches of Global Modulation Block (GB) 306 and Spatial Modulation Block (SB) 308 that respectively upsample global feature $F_g$, and local features $F_s$ in parallel. Different from existing approaches, the CM design introduces a new way to inject the global context (the region(s) outside the hole) into the hole region for image inpainting. This includes a cascade of global and spatial modulations between features at each scale and naturally integrates three compensating mechanisms for global context modeling: 1) feature upsampling allows both GB 306 and SB 308 to utilize the global context from the low-resolution features generated by both of the previous blocks; 2) the global modulation (303) allows both GB 306 and SB 308 to leverage the global code g for generating better global structure; and 3) spatial modulation (307) leverages spatial code (intermediate feature output of GB 306) to further inject fine-grained visual details to SB 308. Spatial codes are described in more detail below.

Figure 4:
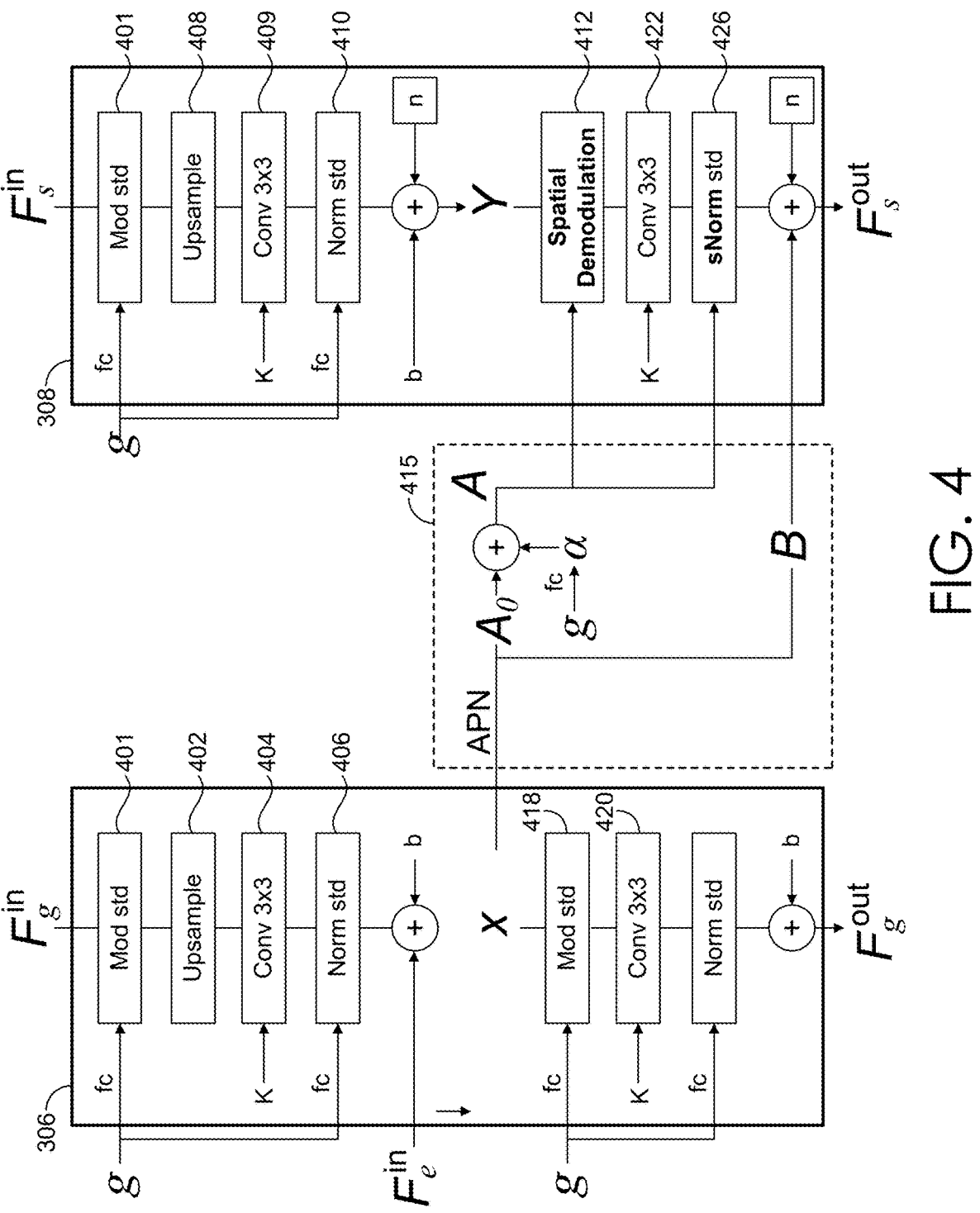
FIG. 4 is a schematic diagram of the global modulation block and the spatial modulation block of FIG. 3 at a specific scale, according to some embodiments.

FIG. 4 is a schematic diagram of the global modulation block 306 and the spatial modulation block 308 of FIG. 3 at a specific scale, according to some embodiments. As illustrated in FIG. 3, the CM at each level of the decoder 304 includes the paralleled GB block (306) and SB block (308) bridged by spatial modulation 307. Such parallel blocks takes the global code (i.e., 401)

$$F_g^{in}; \text{and } F_s^{in}$$

as input and output $$F_g^{out} \text{ and } F_s^{out}.$$

In particular, GB leverages an initial upsampling layer 402 following a convolution layer 404 to generate the intermediate feature X and global output $$F_g^{out},$$

respectively. Both layers are modulated by the global code g (i.e., 406) to capture the global context.

Due to the limited expressive power of the global code g to represent a 2-d scene, and the noisy invalid features inside the inpainting hole, the global modulation alone generates distorted features inconsistent with the context and leads to visual artifacts such as large color blobs and incorrect structures. To address this critical issue, particular embodiments cascade GB 306 with an SB 308 to correct invalid features while further injecting spatial details. SB 308 also takes the global code g (401) to synthesize local details while respecting global context. Specifically, taking the spatial feature $$F_s^{in};$$

as input, SB 308 first upsamples 408, performs convolution 409, and then produces an initial upsampled feature Y with an upsampling layer modulated by global code g produced by 410. Next, Y is jointly modulated 412 by X and g in a spatially adaptive fashion (e.g., via the modulation-convolution-demodulation principle).

Regarding Global-spatial feature modulation 415, a spatial tensor $A_0=APN(X)$ is produced from feature X by a 2-layer convolutional affine parameter network (APN). Meanwhile, a global vector $\alpha=fc(g)$ is produced from the global code g with a fully connected layer (fc) to incorporate the global context. Finally, a fused spatial tensor $A=A_0+\alpha$ leverages both global and spatial information extracted from g and X, respectively, to scale the intermediate feature Y with element-wise product $\odot$:

$$\bar{Y} = Y \odot A. \qquad (1)$$

Regarding convolution 420 and 422, the modulated tensor $\bar{Y}$ is then convolved with a 3×3 learnable kernel K, resulting in $\hat{Y}$ $$\hat{Y} = \bar{Y} \star K \qquad (2)$$

Regarding Spatially-aware demodulation 412 and 426, different from existing spatial modulation methods, particular embodiments discard instance or batch normalization to avoid the known "water droplet" artifact and instead incorporate a spatially-aware demodulation step to produce normalized output $\check{Y}$. Specifically, particular embodiments assume that the input features Y are independent random variables with unit variance and after the modulation 410, the expected variance of the output does not change, i.e. $\mathbb{E}_{y \in \hat{Y}}[Var(y)]=1$. This assumption gives the demodulation computation:

$$\check{Y} = \hat{Y} \odot D \qquad (3)$$

where $$D = \frac{1}{K^2 \odot \mathbb{E}_{a \in A}[a^2]}$$

is the demodulation coefficient. Equation (3) is implemented with standard tensor operations.

Particular embodiments Add spatial bias and broadcast noise. To introduce further spatial variation from feature X, the normalized feature $\check{Y}$ is added to a shifting tensor $B=APN(X)$ produced by another affine parameter network from feature X along with the broadcast noise n to generate the new local feature $$F_s^{out}:$$

$$F_s^{out} = \check{Y} + B + n \qquad (4)$$

The cascaded SB block 308 helps generate fine-grained visual details and improves the consistency of feature values inside and outside the hole. Regarding expanding the receptive field at early stages, the fully convolutional models suffer from slow growth of the effective receptive field, especially at early stages of the network. For this reason, an encoder based on strided convolution usually generates invalid features inside the hole region, making the feature correction at the decoding stage more challenging. Particular embodiments implement fast Fourier convolution (FFC), which helps early layers achieve large receptive fields that cover the entire image. Some embodiments thus replace every convolutional blocks of the CNN encoder with FFC. By adopting FFC at all scale levels, particular embodiments enable the encoder 302 to propagate features at early stages and thus address the issue of generating invalid features inside the holes, helping improve inpainting results.

Figure 5A:
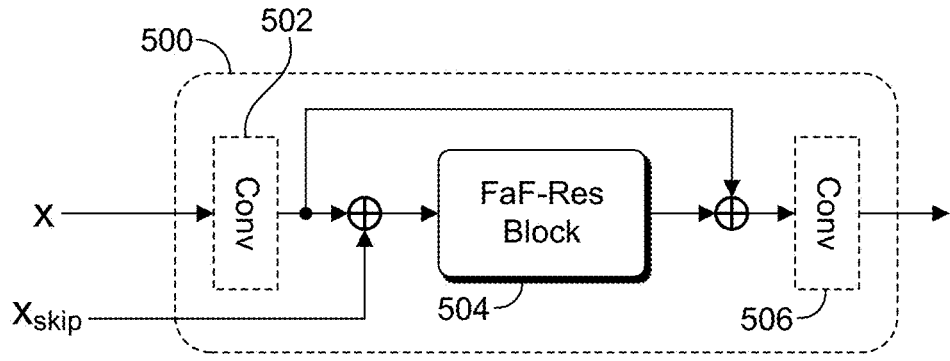
FIG. 5A is a schematic diagram of a FAF synthesis module between the skip connections of the CM-GAN of FIG. 3, according to some embodiments.

FIG. 5A is a schematic diagram of a FAF synthesis module 500 between the skip connections 310 of the CM-GAN 300 of FIG. 3, according to some embodiments. A skip connection adds one or more features from the encoder 302 to the decoder 304. A skip connection is a type of shortcut that connects the output of one layer (the encoder 302) to the input of another layer (the decoder 304) that is not adjacent to it. For example, in a CNN with four layers, A, B, C, and D, a skip connection could connect layer A to layer C, or layer B to layer D, or both. Skip connections can help a neural network learn more complex and diverse patterns from the data and reduce the number of parameters and operations needed by the network. Additionally, skip connections can help to alleviate the problem of vanishing gradients by providing alternative paths for the gradients to flow. Furthermore, they can make it easier and faster to train deeper networks, which have more expressive power and can capture more features from the data.

Instead of just adding a feature to the decoder 304, some embodiments process both decoder feature(s) (X) and encoder features ($X_{skip}$), as illustrated in FIG. 5. Specifically, the decoder feature (X) is convoluted, via 502, is added (or concatenated) with the encoder feature ($X_{skip}$), and then passed to the FaF-Res block 504. The encoder feature is not convoluted, but instead is added (or concatenated) with the decoder feature. Concatenation is the appending of vectors, matrices, or other tensors to form a new vector or matrix.

In some embodiments, convolution at 502 (and/or 506) is performed via a convolution layer. The convolutional layer utilizes one or more filter maps, which each represent a feature (e.g., a sub-image) of the input image (e.g., a foreground wolf object, a portion of a mountain, etc.). There may be various features of an image and thus there may be various linearly stacked filter maps for a given image. A filter map is also an array of values that represent sets of pixels and weights where a value is weighted higher when it matches a corresponding pixel or set of pixels in the corresponding section of the input image. The convolution layer includes an algorithm that uses each filter map to scan or analyze each portion of the input image. Accordingly, each pixel of each filter map is compared and matched up against a corresponding pixel in each section of the input image and weighted according to similarity. In some embodiments, the convolutional layer performs linear functions or operations to arrive at the filter map by multiplying each image pixel value with its own value and then performing a summation function of each product, which is then divided by the total quantity of pixels in the image feature. Put simply, a convolution is the simple application of a filter to an input that results in an activation. Repeated application of the same filter to an input results in a map of activations called a feature map, indicating the locations and strength of a detected feature in an input, such as an image.

In an illustrative example of convolution, an input may be a color image, which is made up of a matrix of pixels in 3D. This means that the input will have three dimensions—a height, width, and depth—which correspond to RGB in an image. There may also be a feature detector, also known as a kernel or a filter, which will move across the receptive fields or windows of the image, checking if the feature is present. This process is known as a convolution. The feature detector is a two-dimensional (2-D) array of weights, which represents part of the image. While they can vary in size, the filter size is typically a 3×3 matrix; this also determines the size of the receptive field. The filter is then applied to an area of the image, and a dot product is calculated between the input pixels and the filter. This dot product is then fed into an output array. Afterwards, the filter shifts by a stride, repeating the process until the kernel has swept across the entire image. The final output from the series of dot products from the input and the filter is known as a feature map, activation map, or a convolved feature. After each convolution operation, in some embodiments a CNN applies a Rectified Linear Unit (ReLU) transformation to the feature map, introducing nonlinearity to the model.

Subsequent to the FaF-Res block 504 (described in more detail below) processing the concatenated encoder and decoder feature, the output is added or concatenated with the decoder feature again, and then applied to another convolution layer 506.

Figure 5B:
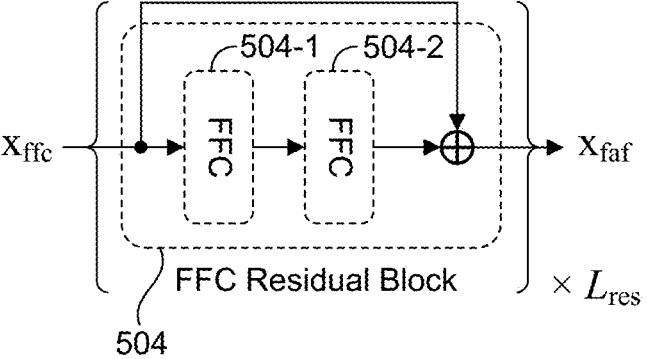
FIG. 5B is a schematic diagram of the FaF-Res block of FIG. 5A, according to some embodiments.

FIG. 5B is a schematic diagram of the FaF-Res block 504 of FIG. 5A, according to some embodiments. As illustrated in FIG. 5B, multiple Fast Fourier Convolutional (FCC) layers 504-1 and 504-2 process the added/concatenated inputs (i.e., the encoder and decoder feature). FFC is a type of convolutional operator that efficiently implements non-local receptive fields and fuses multi-scale information.

Figure 6:
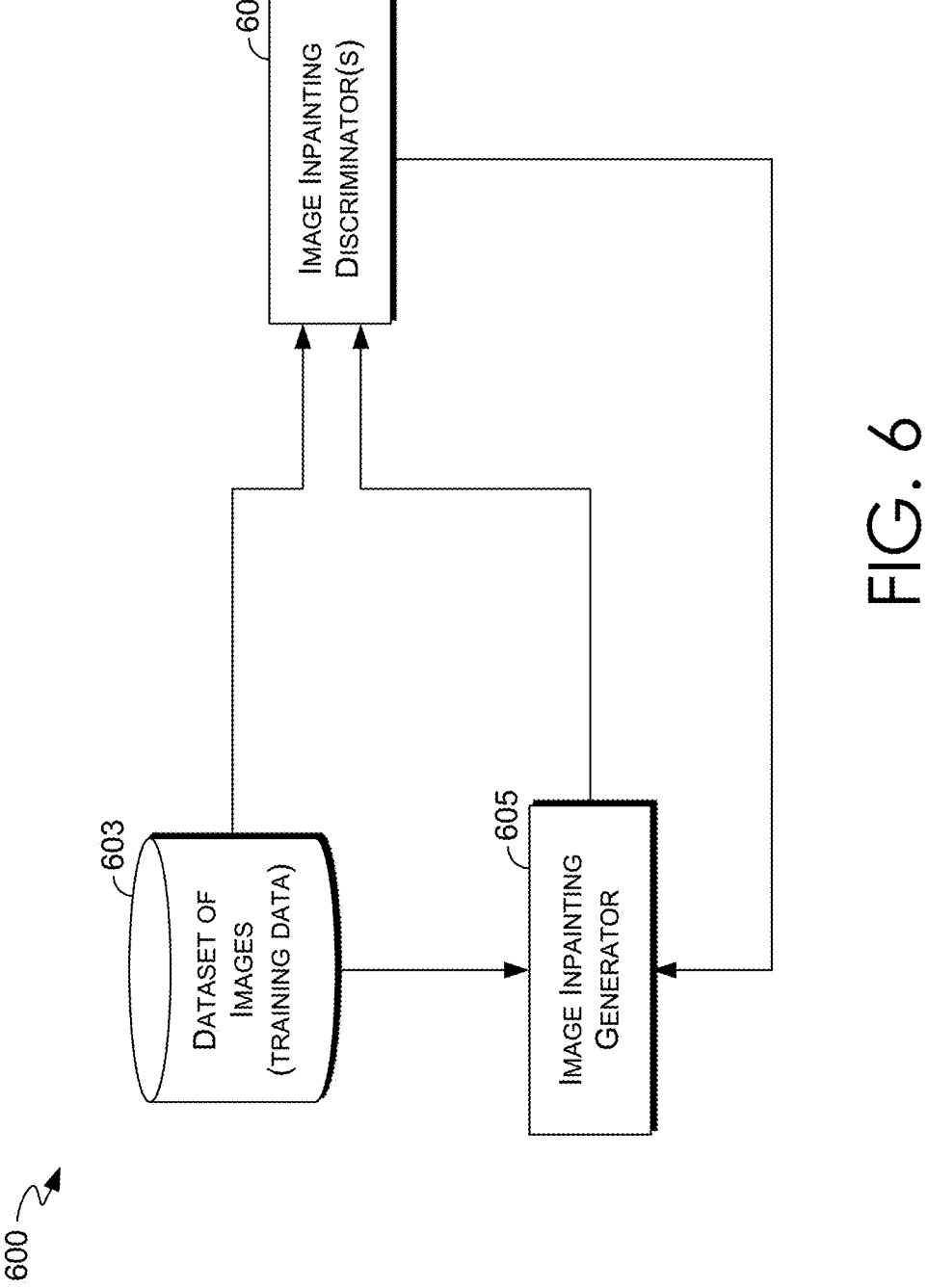
FIG. 6 is a schematic diagram of a Generative Adversarial Network (GAN) for use in generating an image or inpainting an image, according to some embodiments.

FIG. 6 is a schematic diagram of a Generative Adversarial Network (GAN) 600 for use in generating an image or inpainting an image, according to some embodiments. The GAN 600 includes a set of neural networks—the image inpainting generator 605 (a first neural network), one or more image inpainting discriminators 607 (a second neural network), and a dataset of target image(s) 603. In some embodiments, the GAN 600 represents or includes the functionality as described with respect to the image inpainting component 106 of FIG. 1, the based model 208 of FIG. 2, the refinement model 218 of FIG. 2, and/or the Cascaded Modulation (CM) Generative Adversarial Network (GAN) 300 of FIG. 3.

The image inpainting generator 605 is generally responsible for iteratively generating synthetic or "fake" images (and/or "fake" inpainting results over holes) until a fake image is selected for the output by meeting one or more certain thresholds set by the image inpainting discriminator(s) 607. The image inpainting generator 605 iteratively and incrementally generates images with inpainting over masks until it fools (e.g., is within a threshold pixel value/orientation threshold set by) the image inpainting discriminator(s) 607, at which point the corresponding image is outputted, such as in a source image video feed. For example, the image inpainting generator 605 can take, as input, an image with a mask or hole within the dataset of target image(s) 403 and then responsively apply or inpaint pixels over the mask, and then blend the inpainting results to the rest of the image.

In generating these fake images, the image inpainting generator 605 learns the distribution of classes or clusters that represent specific inpainting patterns or textures given the non-masked regions of the dataset of images 603. For example, the image inpainting generator 605 is trained on the dataset of images 603, where images can be labeled as "fake" (1) or "real" (0) and/or "correct inpainting mask" (1)

or "not correct inpainting mask" (0). The image inpainting generator 605 can then learn feature associated with each of these labels so that it knows how to iteratively apply inpainting data to the mask or otherwise generate seamless images (e.g., via blending) (so that the inpainting or image does not appear fake). In some embodiments, the dataset of images 603 includes images with masks or holes (which are used as input for the image inpainting generator 405). Additionally or alternatively, in some embodiments, the dataset of images 603 includes the same (or similar) images without masks or holes (which are used as input by the image inpainting discriminator(s) 607 to compare with the images produced by the image inpainting generator 605).

In some embodiments, the image inpainting generator 605 is built by selecting an input Z, which may be a random number between 0 and 1 (e.g., 0.7). This input may be a feature vector or other tensor that comes from a fixed distribution. Z may then be multiplied by each learned weight, which indicates the learned feature or pixel values and pixel value orientations (coordinates) for the particular inpainting results and/or whether or not the inpainting or image is real. In some embodiments, each pixel in an image is represented by a value (e.g., from 0 to 1), where the value itself and the orientation of the pixels are representative of whether or not there are certain image inpainting results or images present (and/or how much data representing the inpainting results or images is present). In this way, the image inpainting generator 605 can incrementally, for example, adjust individual pixel values (along with sigmoid) until these values fool the image inpainting discriminator(s) 607 by generating pixel values and/or positions within an acceptable threshold or range that the discriminator(s) 607 is aware of. At a high level, what this means is that a well-trained image inpainting generator 605 will always generate images with real looking image inpainting such that the objects represented by the mask appear as though they never existed, but may do so with varying degrees of pixel values.

In some embodiments, the image inpainting discriminator 607(s) is one or more discriminators that is generally responsible for determining, predicting, or estimating whether the images generated by the image inpainting generator 605 are real or fake based on comparing these images to the dataset of target images 603. For instance, the dataset of target images 603 may include a first dataset where each image includes non-masked (or non-inpainted) photographs. In some embodiments, the image inpainting discriminator 607 determines whether an image generated by the image inpainting generator 605 comes from the first data set (even though it is a fake image).

In some embodiments, the image inpainting discriminator(s) 607 additionally or alternatively includes a second discriminator that is generally responsible for determining, predicting, or estimating whether the image inpainting itself generated by the image inpainting generator 605 is present or not present based on comparing these images to the dataset of target images 603. For instance, the dataset of target images 603 may include a first dataset where each image includes non-masked (or non-inpainted) photographs. In some embodiments, the image inpainting discriminator 607 determines whether an image generated by the image inpainting generator 605 comes from the first data set (even though it is a fake image).

In some embodiments, the determination of whether an image is real or fake (or whether image inpainting is present/not present) includes determining whether the pixels are outside of an orientation, position, or pixel value threshold. For example, if a first set of pixel values representing an inpainting result is applied, by the image inpainting generator 605, to an image and placed in hole next to a second set of pixels representing the non-masked region, the first set of pixels can be outside of a threshold relative to the second set of pixel values, which may indicate, for example, that the mountains are a different color or sharpness in the mask relative to the same mountains outside of the mask. Responsively, the image inpainting discriminator 607 can thus determine that the image is fake (e.g., based on the images in the dataset of target images 603 differing over a distance threshold).

Alternatively, or additionally, in some embodiments, the determination of whether an image (or inpainting result) is real or fake includes determining whether a pixel value is outside of a resolution threshold (e.g., relative to other pixels of the same image or based on the images in the dataset of target images 603 differing over a distance threshold). For example, pixel values representing an inpainting results and as generated by image inpainting generator 605 may be grainy at a low resolution, whereas the same image with no mask may be clear at a high-resolution value. Accordingly, the image inpainting generator 607 can determine that the image inpainting results are present or the image is otherwise fake.

In some embodiments, the image inpainting discriminator(s) 607 adds values representing individual pixel values at a specific orientation indicative of image inpainting and subtracts values representing pixel values at a specific orientation indicative of non-image inpainting. Various embodiments can then set any suitable threshold value to indicate whether a certain images are real/not real or whether image inpainting is present. For example, if the summed values are greater than or equal to 1, inpainting may be present relative to values less than 1, which may mean that inpainting not present. In neural networks, and in some embodiments, each neural network node represents a particular pixel of an image and its value. In this way, and using the example above, all the pixel values can be multiplied or added by plus 1 (e.g., a an image inpainting present) or −1 (e.g., an image inpainting not present) for a final aggregation score. Some embodiments use a sigmoid function (a function that converts high numbers to numbers close to 1 and low numbers to numbers close to 0) to get a sigmoid of the output, which represents the probability that image inpainting has been applied/whether the image is real or fake.

Various embodiments train the GAN 600 to get the best possible weights (e.g., values that closely resemble pixel values of inpainting that matches non-masked regions). This can be done via an error function (e.g., log loss or cross entropy loss), which a mechanism to tell the GAN 600 how it is performing. If the error is large, the GAN 600 is not performing well and therefore performs more training epochs until it improves. For instance, if the ground truth represented by a label 1 indicative of a certain image inpainting result, and a prediction is made of 0.1, when it was supposed to be around 1, retraining may occur.

In some embodiments, training occurs via backpropagation by calculating the prediction and then error of that prediction. Then embodiments can take the derivative of the error based on the weights using, for example, the chain rule. This tells the model the quantity or magnitude each weight should be adjusted in order to best decrease the error using gradient descent. In response to this process, the image inpainting generator 605 and the image inpainting discriminator 607 can be trained. Suitable error functions can be placed in suitable locations. At a first training forward pass, the weights can be defined as random numbers. Then Z can be generated, which serves as an input to the image inpainting generator 605. As embodiments perform the first forward pass on the image inpainting generator 605, the output image may likely be fake or not indicative of a particular image inpainting since the weights are random. Various embodiments pass this generated image through the image inpainting discriminator(s) 607. These discriminators output a probability to define the correct error functions. For example, if the label of a generated image is 0 (e.g., no image inpainting), but the image inpainting discriminator 607 makes a prediction 0.54, this means that the image inpainting discriminator 607 is not highly confident that the image does not contain image inpainting. Responsively, an error loss function (e.g., log loss) can be applied to get the prediction closer to 0. However, the image inpainting generator 606's goal is to use the loss of the discriminators as an objective function to modify parameters or weights of its model in order to maximize the loss of the discriminators. Using the example, above, the goal is to get the image inpainting discriminator 607 to output a 1 instead of a 0. In this way, the loss from the image inpainting desriminator(s) 607 is passed to the image inpainting generator 605 so that it can maximize the loss (or get an incorrect prediction) of the discriminators.

In some embodiments, the error loss function of the discriminators are: $E=-Ln(1-D(x))$, where D is the output of prediction of the discriminators. In some embodiments, the error loss function of the image inpainting generator 605 is $E=-ln(D(G(z)))$, where G is the output or prediction of the image inpainting generator 605.

The derivatives of these two error loss functions can help the model update the weights of the image inpainting generator 605 and the image inpainting discriminator(s) 607 in order to improve a particular prediction. Accordingly, the tension or adversarial nature between these components adjusts weights in the respective models, such that there is no collision. This process can be repeated many times during training. After various iterations or epochs, the image inpainting generator 605 will be trained to generate images with inpainting pixel values that closely resemble the non-masked portions based on the image inpainting discriminator 607 and where the image inpainting results have a realistic look.

In some embodiments, at runtime or when a model is deployed after training, the image inpainting generator 605 generates actual images (e.g., an image uploaded by a user for an image inpainting request) and because it has been trained with the correct loss, it outputs images with filled holes/masks (i.e., image inpainting) in a manner that looks realistic. This is because it generates optimal pixel values inside an acceptable threshold determined by the image inpainting discriminator(s) 607.

Figure 7A:
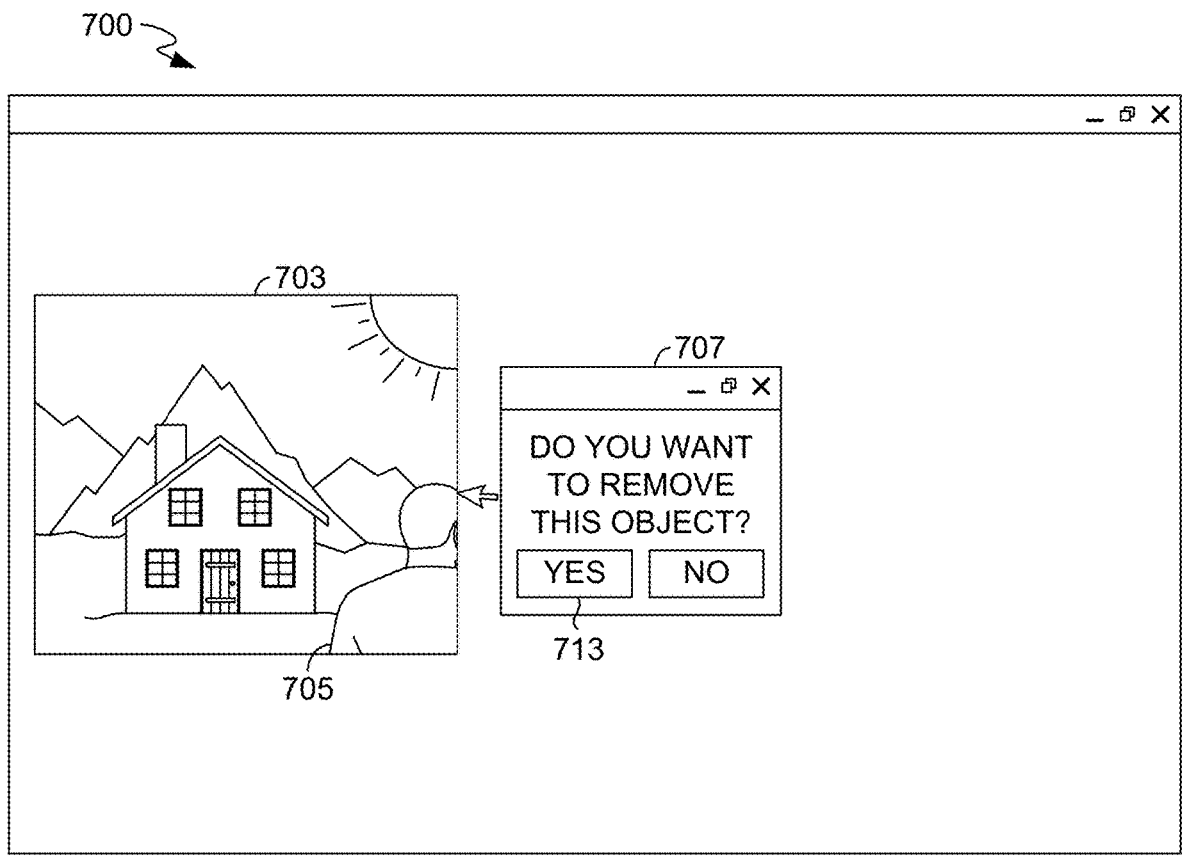
FIG. 7A is an example screenshot of a user interface, according to particular embodiments.

FIG. 7A is an example screenshot 700 of a user interface, according to particular embodiments. FIG. 7A illustrates an input image 703 that has been uploaded at a consumer application (e.g., a web or app-based application). In some embodiments, subsequent to the upload, the mask generation component 102 performs its functionality to detect objects, such as the object 705. Additionally or alternatively, a user may click, select, perform a lasso gesture around, or otherwise make in input action to the set of pixels representing the object 705, which outlines a silhouette of a person covering the rest of the geographical area. In response to receiving such user input, various embodiments prompt, via the dialogue box 707, whether the user would like to remove the object 705 (and fill the corresponding hole or mask). In response to receiving user input indicating that the user would like to remove the object 705 (i.e., a selection of the "YES" button 713), various embodiments begin the inpainting process by masking all of the pixels representing the object 705 (e.g., as described with respect to the mask generation component 102), as described in more detail below with respect to FIG. 7B.

Figure 7B:
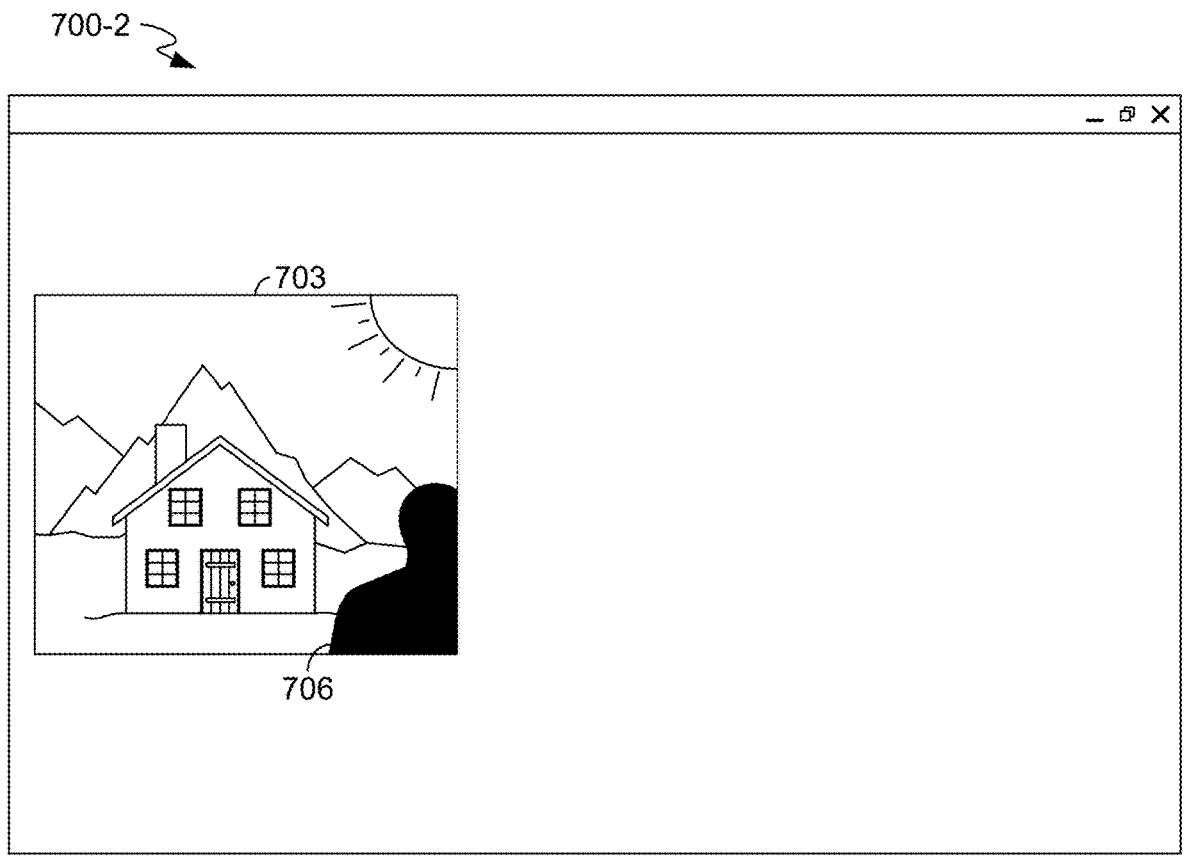
FIG. 7B is an example screenshot of a user interface that illustrates a masking of the image of FIG. 7A, according to some embodiments.

FIG. 7B is an example screenshot 700-2 of a user interface that illustrates a masking of the image 703 of FIG. 7A, according to some embodiments. In response to receiving an indication that the "YES" button 713 of FIG. 7A has been selected, particular embodiments generate a mask 706 by removing and/or replacing the pixel values corresponding to the object 705 with a single pixel value (e.g., representing a black color). In response to such functionality, in some embodiments, the downsampling component 104, the image inpainting component 106, the upsampling component 112, the blending component 118, and/or the inpainting refinement then performs its functionality to generate the inpainting results/mask, as illustrated in by 720 of FIG. 7C.

Figure 7C:
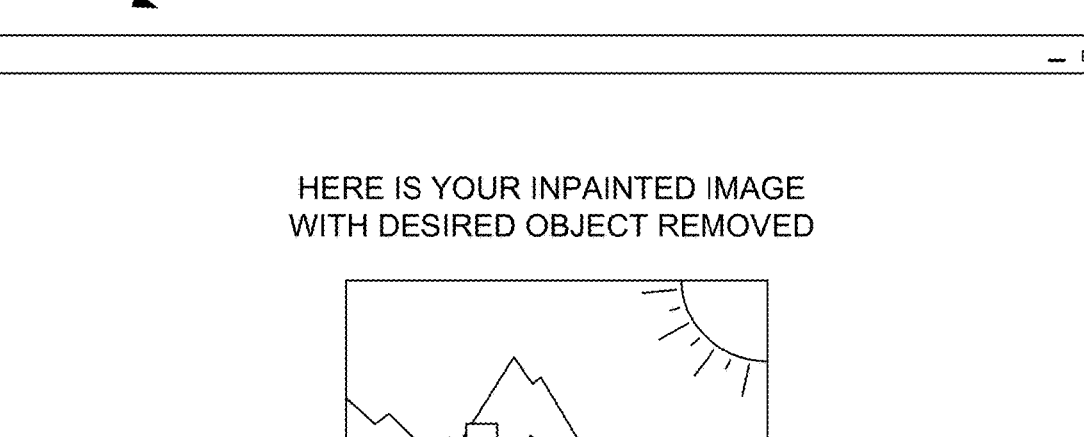
FIG. 7C is an example screenshot of a user interface illustrating image inpainting to fill in or change the pixel values of the mask of FIG. 7B, according to some embodiments.

FIG. 7C is an example screenshot 700-3 of a user interface illustrating image inpainting to fill in or change the pixel values of the mask 706 of FIG. 7B, according to some embodiments. In some embodiments, in response to the downsampling component 104, the image inpainting component 106, the upsampling component 112, the blending component 118, and/or the inpainting refinement component 114 performing their functionality as described with respect to FIG. 1, the output image 721 is provided with the inpainting result/mask 720, as illustrated in FIG. 7C. As illustrated in FIG. 7C, the inpainting result/mask 720 contains pixel values and orientations that match textures, line segments, or other features of the non-masked region 722 such that the image 721 appears as though the object 705 never existed. For example, as illustrated in FIG. 7C, the non-masked regions 722 contain line segments corresponding to mountain and foreground features that continue into the inpainting result.

Exemplary Flow Diagrams

FIG. 8 is a flow diagram of an example process 800 for pre-processing training images in preparation for model training, according to some embodiments. The process 800 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 9). The computer-implemented method, the system (that includes at least one computing device having at least one processor and at least one computer readable storage medium), and/or the computer readable medium as described herein may perform or be caused to perform the process 800 or any other functionality described herein. In some embodiments, the process 800 is performed by the mask generation component 102 of FIG. 1.

The process 800 of FIG. 8 illustrates an algorithm to generate masks for training. In many cases, the sampled masks should be similar to the masks drawn in realistic use-cases at runtime. Moreover, the masks in many cases should avoid covering an entire object or most of any new object to discourage model from generating object-like patterns. Previous works generate mask with square-shaped masks or use random strokes or a mixture of both for training. These oversimplified mask schemes may cause casual artifacts such as suspicious objects or color blobs. To better support realistic object removal use cases while preventing the model from trying to synthesize new objects inside the holes, the process 800 is proposed, which is an object-aware training scheme that generates more realistic masks during training or in preparation for training.

Per block 802, some embodiments receive a plurality of training images, where each training image is over a resolution threshold. For example, the training images can include 1 million high-resolution images (e.g., images over 2 k) from the Cooper dataset (from Lr) and 17 million images from Stock for inpainting training. These images have larger resolution with better quality (image longer side>=1000 pxl vs Places2~500 pxl), and also include macro pictures. A "macro picture" is a close-up photograph, usually of very small objects and living organisms like insects, small pebbles, and the like in which the size of the subject in the photograph is greater than life size. In this way, texture, shading, reflection, and the like can be better captured than regular photographs. In an illustrative example, the plurality of training images can include high-resolution photographs of up-close images of pebbles, dirt, sand and/or small plants.

Per block 804, some embodiments pass (e.g., programmatically call or communicate over a network to) the plurality of images to an object detector for detecting each object in each training image, of the plurality of training images. In some embodiments, such detection includes some of the functionality (e.g., object detection or panoptic segmentation) as descried with respect to the mask generation component 102 of FIG. 1. For example, some embodiments use PanopticFCN to generate pseudo panoptic segmentation labels (e.g., object=cat) on these training images. In this way, these models generate highly accurate instance-level segmentation annotations.

Per block 806, some embodiments generate a mask over each image in the plurality of training images. For example, particular embodiments can change the pixel values in 2D to a singular value to represent a mask, which can include foreground objects, background objects, or any other pixels in the image. In some embodiments, block 806 is performed by sampling a mixture of freeform holes and object holes as the initial mask.

Per block 808, based on the passing at block 806, some embodiments compute an overlapping ratio between each mask and each object detected in each image at block 804. In some embodiments, such computation is based on any suitable overlapping or distance algorithms, such as K-means clustering (using Euclidian distance) or Jaccard index to determine the overlap between the mask and each object.

Per block 810, particular embodiments determine if the overlapping ratio is greater than a threshold (e.g., a Euclidian distance or overlap threshold in pixels). Per block 812, if the overlapping ratio is greater than the threshold, particular embodiments exclude the object from the mask. In other words, particular embodiments either change the original mask value (e.g., a black pixel value) indicated in the object back to the original pixel values for the object or otherwise keep the non-masked object from being masked. For example, if a particular foreground instance is currently masked, particular embodiments exclude the foreground instance from being included in any portion of the mask by changing the mask values back to their original values. Per block 814, if the overlapping ratio is not greater than the threshold, particular embodiments keep the mask unchanged. In other words, the hole is unchanged to mimic object completion. In some embodiments, the threshold at block 810 is 0.5. Some embodiments additionally dilate and translate the object masks randomly to avoid overfitting. Particular embodiments also dilate the hole on the instance segmentation boundary to avoid leaking background pixels near the hole into the inpainting region.

FIG. 9 is a flow diagram of an example process 900 for training a Generative Adversarial Network (GAN), according to some embodiments. In some embodiments, the process 900 occurs in response to the process 800 of FIG. 8. Per block 903, some embodiments receive a first set of masked images. In some embodiments, the first set of masked images represent the masked training images after blocks 814 or 812 have been completed for each image, as described with respect to the process 800 of FIG. 8.

Per block 905, some embodiments extract features from each masked image, of the first set of masked images. For example, particular embodiments convert each image into a matrix of values that each represent a pixel value. Responsively, a filter move across the receptive fields or windows of the image, extracting any feature present (e.g., convolution).

Per block 907, some embodiments generate a second set of images by generating an inpainting result over each mask, of the first set of images. For example, the improved CM-GAN as described herein (e.g., the CM-GAN 300 of FIG. 3) performs image inpainting to fill in the masks based on patterns detected in the non-masked regions of the first set of images.

Per block 909, some embodiments transform the first set of masked images and the second set of images. In some embodiments, to "transform" images refers to random image translation within 12.5% of the image height/width to both the first set of images and the second set of images before calculating perceptual loss on top of them. In an illustrative example of transformation, some embodiments perform a random combination of simple transformations, such as translations, flipping, mirroring, permutation of color channels, scalar multiplication (brightness change), and downscaling, all with randomly chosen parameters. Furthermore, the simple random transformations are combined randomly, making the effective size of the ensemble very large. Accordingly, in some embodiments, translation can thus include geometric transformations, color transformations, or the like. In some embodiments, transformation includes warping. A "warped" image, as described herein, is an image where at least a portion of the content or pixels of a source image have been transformed in some way. This transformation typically occurs when content or pixels have changed location (e.g., as opposed to changing mere pixel values, such as in filtering) from an original source image to a transformed image. For example, a first source image can include a set of pixels representing a car. A warped image can be generated by applying a "rotation" transformation parametrically to the entire first source image such that the pixels representing the car (and the rest of the source image) change their positioning, thereby indicating the rotation transformation.

In some embodiments, transformation at block 909 alternatively or additionally includes upsampling, downsampling, or otherwise changing the size of the images. For example, particular embodiments randomly pick 70% of the images and add the following augmentation: first, the image aspect ratio is randomly rescaled to 80%-120%, then the image is randomly resized to shorter edge, such s [512, min(2048, original shorter edge length)]. Finally, particular embodiments take a 512×512 random crop on the top of the images. In this way, the training data is closer to the test input in real uses cases at runtime, and helps improve the inpainting performance.

Per block 911, based on the transformation at block 909, some embodiments calculate a perceptual loss. Perceptual loss functions are used when comparing the first set of images with the transformed first set of images and the second set of images with the transformed second set of images. For example, the input image 202 of FIG. 2 can be compared to a rotated version of the input image 202 to calculate the differences via perceptual loss. This function is used to compare high level differences, like content and style discrepancies, between images. In some embodiments, the perceptual loss function works by summing all the squared errors between all the pixels for each of the transformed images and non-transformed images and taking the mean.

Per block 913, particular embodiments calculate an adversarial loss, as described, for example, with respect to FIG. 6, where the loss between the results generated by the image inpainting generator 605 and the image inpainting discriminator(s) 607 are computed. In some embodiments, additional (or alternative) losses can be computed, such as L1 loss. L1 loss is used to minimize the error, which is the sum of all the absolute differences in between the true value and the predicted value. L1 loss is also known as the Absolute Error and the cost is the Mean of these Absolute Errors (MAE).

Per block 915, based on the calculation of the perceptual loss and the adversarial loss, particular embodiments train an adversarial neural network. For example, particular embodiments learn the weight values to input at a weight tensor so that the transformed images do not exceed a warping threshold relative to the non-transformed images. Additionally, some embodiments learn other weight values to generate a realistic and seamless inpainting results over the mask, where the weight values represent pixel values or orientations to fill inside the masked based on learned patterns outside of the mask.

FIG. 10 is a flow diagram of an example process 1000 for performing image inpainting via downsampling an input image and upsampling to an output image, according to some embodiments. Per block 1002, some embodiments receive a first image at a first resolution, where the first image includes a mask (e.g., 202-1 of FIG. 2) that is indicative of a hole associated with image inpainting. For example, the first image can be the image 202 of FIG. 2. Per block 1004, some embodiments generate a second image by downsampling the first image to a second resolution that is lower than the first resolution. In some embodiments, block 1004 includes, for example, the downsampling 204 of the image 202 to derive the second image (i.e., the image 206).

Per block 1006, in response to the generation of the second image, particular embodiments provide the second image as input to a first machine learning model. In some embodiments, this includes, for example, providing the image 206 of FIG. 2 to the base model 208 of FIG. 2. In some embodiments, the first machine learning model includes a Generative Adversarial Network (GAN) that includes an encoder with Fourier convolution blocks, a decoder that includes a global modulation block, and a spatial modulation block, and skip connections between the encoder and decoder, as described, for example, with respect to FIG. 3. In some embodiments, the first machine learning model further includes Fast Fourier Convolution (FCC)

layers at the skip connections between the encoder and the decoder, as described, for example with respect to FIGS. 5A and 5B.

In response to block 1006 (or as a part of block 10006), some embodiments determine that the first resolution exceeds a first threshold. In response to such determining, some embodiments determine a size of the mask. Based on the size of the mask, some embodiments compute a minimum crop size for the image inpainting. Based on the computing, some embodiments crop the first image into a smaller section, where the generating of the second image includes down sampling the smaller section to the second resolution that is lower than the first resolution. And subsequent to the replacing of the mask with the first set of pixels (block 1008), some embodiments blend the smaller section back to the first image. In some embodiments, all of this functionality includes the functionality as described with respect to the crop-based inference module 116 of FIG. 1. In some embodiments, the first machine learning model as described in block 1006 is trained via the process 900 of FIG. 9.

Per block 1008, based on the providing at block 1006, some embodiments receive a third image at the second resolution, where the third image is identical to the second image except that the mask is replaced by a first set of pixels, and where the replacement of the mask is indicative of image inpainting. In some embodiments, the third image is included in an output of the first machine learning model. For example, the third image can be image 210 of FIG. 2, which is an output of the base model 208. In some embodiments, block 1008 is performed directly by the first machine learning model such that the model inpaints the second image by replacing the mask with a first set of pixels in response to the generating of the second image.

Per block 1010, in response to the receiving of the third image, some embodiments generate a fourth image by upsampling the third image, where the upsampling includes generating one or more portions of the fourth image at the first resolution. For example, the generating can include generating pixels outside of the first set of pixels back to the first resolution. To get high-resolution image content outside of the hole, particular embodiments rely on the blending operation. The naive upsampling operation 212 (e.g., bicubic upsampling) will increase the size of the image (number of pixels) but the image content will typically be blurry. In an illustrative example of block 1010, FIG. 2 describes upsampling 212 the image 210 to derive the image 214. In some embodiments, the one or more portions are outside of a second set of pixels representing the first set of pixels of the third image, where the second set of pixels are lower in resolution than the one or more portions. In response to the generating of the fourth image, some embodiments provide the fourth image as input into a second machine learning model. Based on the providing of the fourth image as second input into the second learning model, some embodiments receive a second output of the second machine learning model, where the second output includes a changed higher resolution of the second set of pixels that match the first resolution. Examples of this are described with respect to the refinement model 218 (i.e., the second machine learning model) that further refines the inpainted region covering the mask, as illustrated in the image 220. In some embodiments, both the first machine learning model and the second machine learning model are Generative Adversarial Network (GAN) models, where the second machine learning model has fewer bottleneck layers and channels relative to the first machine learning model.

Exemplary Operating Environments

Figure 11:
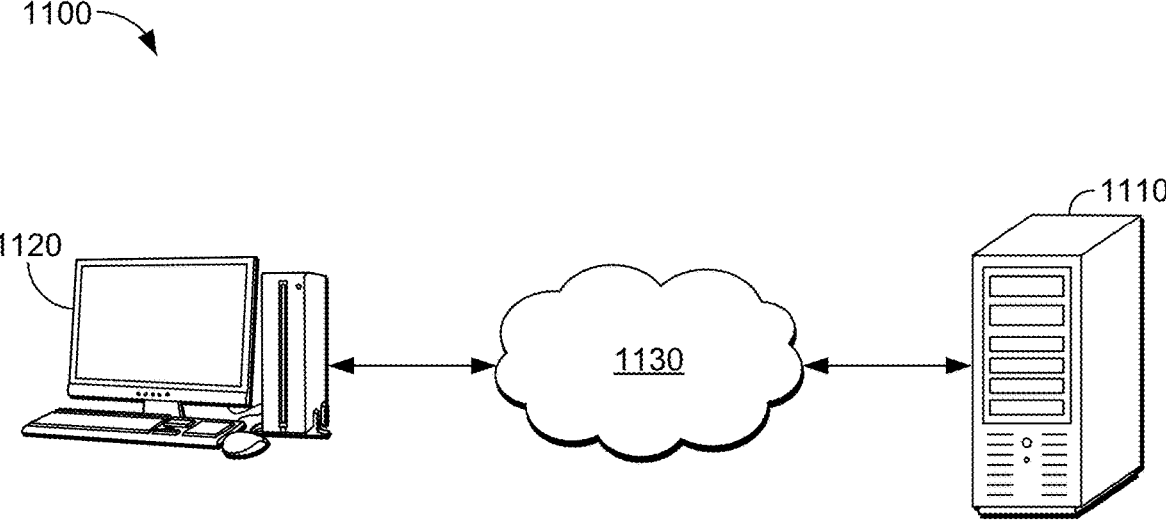
FIG. 11 is an example computer environment in which aspects of the present disclosure are employed, according to some embodiments.

Turning now to FIG. 11, a schematic depiction is provided illustrating an example computing environment 1100 for reconstructing one or more images of a target image, in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. For example, there may be multiple servers 1110 that represent nodes in a cloud computing network. Various functions described herein as being performed by one or more entities may be carried out by hardware, firmware, and/or software. For instance, various functions may be carried out by a processor executing instructions stored in memory.

The environment 1100 depicted in FIG. 11 includes a prediction server ("server") 1110 that is in communication with a network 110. The environment 1100 further includes a client device ("client") 1120 that is also in communication with the network 110. Among other things, the client 1120 can communicate with the server 1110 via the network 110, and generate for communication, to the server 1110, a request to make a detection, prediction, or classification of one or more instances of a document/image. The request can include, among other things, a document with content order values. In various embodiments, the client 120 is embodied in a computing device, which may be referred to herein as a client device or user device, such as described with respect to the computing device 1200 of FIG. 12.

In some embodiments, each component in FIG. 1 is included in the server 1110 and/or the client device 1120. Alternatively, in some embodiments, the components of FIG. 1 are distributed between the server 1110 and client device 1120.

The server 1110 can receive the request communicated from the client 1120, and can search for relevant data via any number of data repositories to which the server 1110 can access, whether remotely or locally. A data repository can include one or more local computing devices or remote computing devices, each accessible to the server 1110 directly or indirectly via network 110. In accordance with some embodiments described herein, a data repository can include any of one or more remote servers, any node (e.g., a computing device) in a distributed plurality of nodes, such as those typically maintaining a distributed ledger (e.g., block chain) network, or any remote server that is coupled to or in communication with any node in a distributed plurality of nodes. Any of the aforementioned data repositories can be associated with one of a plurality of data storage entities, which may or may not be associated with one another. As described herein, a data storage entity can include any entity (e.g., retailer, manufacturer, e-commerce platform, social media platform, web host) that stores data (e.g., names, demographic data, purchases, browsing history, location, addresses) associated with its customers, clients, sales, relationships, website visitors, or any other subject to which the entity is interested. It is contemplated that each data repository is generally associated with a different data storage entity, though some data storage entities may be associated with multiple data repositories and some data repositories may be associated with multiple data storage entities. In various embodiments, the server 1110 is embodied in a computing device, such as described with respect to the computing device 1200 of FIG. 12.

Figure 12:
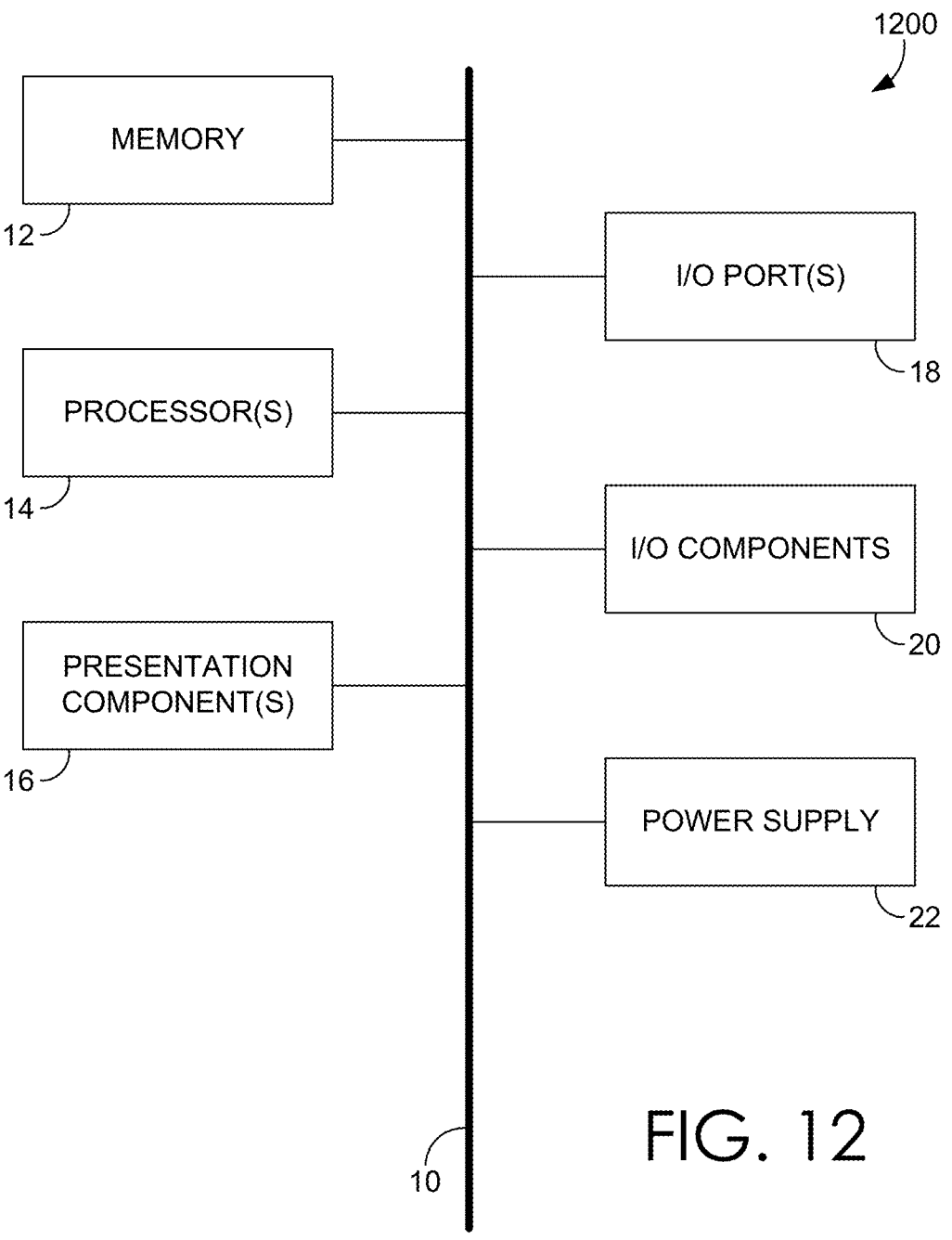
FIG. 12 is a block diagram of a computing device in which aspects of the present disclosure employ, according to some embodiments.

Having described embodiments of the present invention, an exemplary operating environment in which embodiments of the present invention may be implemented is described below in order to provide a general context for various aspects of the present invention. Referring initially to FIG. 12 in particular, an exemplary operating environment for implementing embodiments of the present invention is shown and designated generally as computing device 1200. Computing device 1200 is but one example of a suitable computing environment and is not intended to suggest any limitation as to the scope of use or functionality of the invention. Neither should the computing device 1200 be interpreted as having any dependency or requirement relating to any one or combination of components illustrated.

Looking now to FIG. 12, computing device 1200 includes a bus 10 that directly or indirectly couples the following devices: memory 12, one or more processors 14, one or more presentation components 16, input/output (I/O) ports 18, input/output components 20, and an illustrative power supply 22. Bus 10 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 12 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media. In various embodiments, the computing device 1200 represents the client device 1120 and/or the server 1110 of FIG. 11.

Memory 12 includes computer-storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 12 or I/O components 20. Presentation component(s) 16 present data indications to a user or other device. Exemplary presentation components include a display device, speaker, printing component, vibrating component, etc. In some embodiments, the memory includes program instructions that, when executed by one or more processors, cause the one or more processors to perform any functionality described herein, such as the process 900 of FIG. 9, process 1000 of FIG. 10, or any functionality described with respect to FIGS. 1 through 11.

I/O ports 18 allow computing device 1200 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be equipped with depth cameras, such as stereoscopic camera systems, infrared camera systems, RGB camera systems, touchscreen technology, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

As can be understood, embodiments of the present invention provide for, among other things, generating proof and attestation service notifications corresponding to a determined veracity of a claim. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub combinations are of utility and may be employed without reference to other features and sub combinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:

at least one computer processor; and one or more computer storage media storing computer-useable instructions that, when used by the at least one computer processor, cause the at least one computer processor to perform operations comprising:

receiving a first image at a first resolution, the first image associated with a mask that is indicative of a hole associated with image inpainting;

generating a second image by downsampling the first image to a second resolution that is lower than the first resolution;

in response to the generating of the second image, providing the second image as input to a first machine learning model;

based on the providing, receiving a third image at the second resolution, the third image being included in an output of the first machine learning model, the third image being identical to the second image except that the mask is replaced by a first set of pixels representing an inpainted region;

in response to the receiving of the third image, generating a fourth image by upsampling the third image, the upsampling of the third image includes generating, at the first resolution, one or more portions of the fourth image, the one or more portions of the fourth image being outside of a second set of pixels representing the inpainted region, the second set of pixels representing the inpainted region being lower in resolution than the one or more portions of the fourth image that are outside of the second set of pixels representing the inpainted region;

in response to the generating of the fourth image, providing the fourth image as second input into a second machine learning model; and based on the providing of the fourth image as second input into the second machine learning model, receiving a second output of the second machine learning model, wherein the second output includes a changed higher resolution of the second set of pixels representing the inpainted region that match the first resolution of the one or more portions of the fourth image that are outside of the second set of pixels representing the inpainted region.

2. The system of claim 1, wherein the first machine learning model and the second machine learning model are Generative Adversarial Network (GAN) models, and wherein the second machine learning model has fewer bottleneck layers and channels relative to the first machine learning model.

3. The system of claim 1, wherein the first machine learning model includes a Generative Adversarial Network (GAN) that includes an encoder with Fourier convolution blocks, a decoder that includes a global modulation block and a spatial modulation block, and Fast Fourier Convolution (FFC) layers at skip connections between the encoder and the decoder, the global modulation block modulating one or more intermediate features using a global code to inject contextual information from outside the first set of pixels to the first set of pixels representing inside the inpainting region, the spatial modulation block modulating spatial features using the global code and a spatial code to inject fine-grained visual details into the first set of pixels representing the inpainted region.

4. The system of claim 3, wherein the first machine learning model further includes Fast Fourier Convolution (FFC) layers at the skip connections between the encoder and the decoder.

5. The system of claim 1, wherein the operations further comprising:

determining that the first resolution exceeds a first threshold;

in response to the determining, determining a size of the mask;

based on the size of the mask, computing a minimum crop size for the image inpainting;

based on the computing, cropping the first image into a smaller section, and wherein the generating of the second image includes downsampling the smaller section to the second resolution that is lower than the first resolution; and subsequent to the replacing of the mask with the first set of pixels, blending the smaller section back to the first image.

6. The system of claim 1, wherein the operations further comprising training the first machine learning model by:

receiving a set of masked training images;

transforming the set of masked training images;

based on the transforming, calculating a perceptual loss;

calculating an adversarial loss; and based on the calculation of the perceptual loss and the adversarial loss, training the first machine learning model.

7. A computer-implemented method comprising:

receiving a first image at a first resolution, the first image associated with a mask that is indicative of a hole associated with image inpainting;

generating a second image by downsampling the first image to a second resolution that is lower than the first resolution;

in response to the generating of the second image, inpainting, via a first machine learning model, the second image by replacing the mask with a first set of pixels representing an inpainted region;

in response to the inpainting of the second image, generating a third image by upsampling the inpainted second image, the upsampling includes generating one or more portions outside of the first set of pixels representing the inpainted region back to the first resolution;

in response to the upsampling of the inpainted second image, providing the third image as second input into a second machine learning model; and based on the providing of the third image as second input into the second machine learning model, changing a resolution of the first set of pixels representing the inpainted region to match the first resolution of the one or more portions of the third image that are outside of the first set of pixels representing the inpainted region.

8. The computer-implemented method of claim 7, wherein the first machine learning model and the second machine learning model are Generative Adversarial Network (GAN) models, and wherein the second machine learning model has fewer bottleneck layers and channels relative to the first machine learning model.

9. The computer-implemented method of claim 1, wherein the first machine learning model includes a Generative Adversarial Network (GAN) that includes an encoder with Fourier convolution blocks, a decoder that includes a global modulation block and a spatial modulation block, and skip connections between the encoder and the decoder.

10. The computer-implemented method of claim 9, wherein the first machine learning model further includes Fast Fourier Convolution (FFC) layers at the skip connections between the encoder and the decoder.

11. The computer-implemented method of claim 1, further comprising:

determining that the first resolution exceeds a first threshold;

in response to the determining, determining a size of the mask;

based on the size of the mask, computing a minimum crop size for the image inpainting;

based on the computing, cropping the first image into a smaller section, and wherein the generating of the second image includes downsampling the smaller section to the second resolution that is lower than the first resolution; and subsequent to the replacing of the mask with the first set of pixels, blending the smaller section back to the first image.

12. The computer-implemented method of claim 7, wherein the method further comprising training the first machine learning model by:

receiving a set of masked training images;

transforming the set of masked training images;

based on the transforming, calculating a perceptual loss;

calculating an adversarial loss; and based on the calculation of the perceptual loss and the adversarial loss, training the first machine learning model.

13. A computer system comprising:

a downsampling means for receiving a first image at a first resolution and generating a second image by downsampling the first image to a second resolution that is lower than the first resolution, the first image and the second image associated with a mask that is indicative of a hole associated with image inpainting;

an image inpainting means for inpainting, via a first machine learning model, the second image by replacing the mask with a first set of pixels representing an inpainted region in response to the generating of the second image;

an upsampling means for generating a third image by upsampling the inpainted second image, the upsampling includes generating one or more portions outside of the first set of pixels higher than the second resolution;

an inpainting refinement means for in response to the upsampling of the inpainted second image, providing the third image as second input into a second machine learning model; and based on the providing of the third image as second input into the second machine learning model, changing a resolution of the first set of pixels representing the inpainted region to match the first resolution of the one or more portions of the third image that are outside of the first set of pixels representing the inpainted region.

14. The computer system of claim 13, wherein the first machine learning model and the second machine learning model are Generative Adversarial Network (GAN) models, and wherein the second machine learning model has fewer bottleneck layers and channels relative to the first machine learning model.

15. The computer system of claim 13, wherein the first machine learning model includes a Generative Adversarial Network (GAN) that includes an encoder with Fourier convolution blocks, a decoder that includes a global modulation block and a spatial modulation block, and skip connections between the encoder and the decoder.

16. The computer system of claim 13, wherein the first machine learning model further includes Fast Fourier Convolution (FFC) layers at the skip connections between the encoder and the decoder.

17. The computer system of claim 13, further comprising a blending means for:

determining that the first resolution exceeds a first threshold;

in response to the determining, determining a size of the mask;

based on the size of the mask, computing a minimum crop size for the image inpainting;

based on the computing, cropping the first image into a smaller section, and wherein the generating of the second image includes downsampling the smaller section to the second resolution that is lower than the first resolution; and subsequent to the replacing of the mask with the first set of pixels, blending the smaller section back to the first image.

\*   \*   \*   \*   \*